US010680291B2

United States Patent
Saeki et al.

(10) Patent No.: US 10,680,291 B2
(45) Date of Patent: Jun. 9, 2020

(54) NONAQUEOUS ELECTROLYTE BATTERY INORGANIC PARTICLES AND NONAQUEOUS ELECTROLYTE BATTERY

(71) Applicant: Asahi Kasei Kabushiki Kaisha, Tokyo (JP)

(72) Inventors: Hiroyuki Saeki, Tokyo (JP); Nobuhiro Ito, Tokyo (JP); Yoshiyuki Ishii, Tokyo (JP); Kunio Matsui, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/079,575

(22) PCT Filed: Feb. 24, 2017

(86) PCT No.: PCT/JP2017/007221
§ 371 (c)(1),
(2) Date: Aug. 24, 2018

(87) PCT Pub. No.: WO2017/146237
PCT Pub. Date: Aug. 31, 2017

(65) Prior Publication Data
US 2019/0067748 A1  Feb. 28, 2019

(30) Foreign Application Priority Data

Feb. 25, 2016 (JP) .................. 2016-034912
Jul. 29, 2016 (JP) .................. 2016-150749

(51) Int. Cl.
*H01M 2/16* (2006.01)
*H01M 10/42* (2006.01)
(Continued)

(52) U.S. Cl.
CPC ......... *H01M 10/4235* (2013.01); *H01M 2/02* (2013.01); *H01M 2/16* (2013.01);
(Continued)

(58) Field of Classification Search
CPC ........ H01M 4/13; H01M 4/131; H01M 4/136; H01M 4/139; H01M 4/1391; H01M 4/36;
(Continued)

(56) References Cited

U.S. PATENT DOCUMENTS 6,365,299 B1  4/2002  Miyaki et al.
2005/0244714 A1*  11/2005  Zhu .................. H01M 4/244
429/232
(Continued)

FOREIGN PATENT DOCUMENTS

EP  1120850 A1  8/2001
JP  H01-103914 A  4/1989
(Continued)

OTHER PUBLICATIONS

Supplemental European Search Report issued in corresponding European Patent Application No. 17756671.8 dated Nov. 21, 2018.
(Continued)

*Primary Examiner* — Raymond Alejandro
(74) *Attorney, Agent, or Firm* — Morgan, Lewis & Bockius LLP

(57) ABSTRACT

The nonaqueous electrolyte battery inorganic particles according to the present invention include a metal element having a smaller electronegativity than manganese in a crystal structure, and comprise a laminar compound which has an interlayer distance of 0.40-2.0 nm or less and which has exchangeable cations other than hydrogen ions between the layers.

17 Claims, 1 Drawing Sheet

(51) Int. Cl.
    *H01M 4/62*     (2006.01)
    *H01M 2/02*     (2006.01)
    *H01M 10/056*     (2010.01)
    *H01M 10/052*     (2010.01)
    *H01M 10/0587*     (2010.01)
    *H01M 10/0585*     (2010.01)
    *H01M 4/13*     (2010.01)
    *H01M 10/0525*     (2010.01)

(52) U.S. Cl.
    CPC ....... *H01M 2/1646* (2013.01); *H01M 2/1686* (2013.01); *H01M 4/13* (2013.01); *H01M 4/62* (2013.01); *H01M 10/052* (2013.01); *H01M 10/056* (2013.01); *H01M 10/0525* (2013.01); *H01M 10/0585* (2013.01); *H01M 10/0587* (2013.01); *Y02E 60/122* (2013.01); *Y02T 10/7011* (2013.01)

(58) Field of Classification Search
    CPC ........ H01M 4/366; H01M 4/48; H01M 4/483; H01M 4/485; H01M 4/50; H01M 4/502; H01M 4/505; H01M 4/52; H01M 4/525; H01M 4/62; H01M 4/621; H01M 4/624; H01M 4/626; H01M 10/4235; H01M 10/052; H01M 10/0525; H01M 10/056; H01M 10/0585; H01M 10/0587; H01M 2/02; H01M 2/16; H01M 2/1646; Y02E 60/122; Y02T 10/7011
See application file for complete search history.

(56) References Cited

U.S. PATENT DOCUMENTS

| | | |
|---|---|---|
| 2009/0098450 A1 | 4/2009 | Kikuchi et al. |
| 2009/0272293 A1 | 11/2009 | Ono |
| 2011/0281161 A1 | 11/2011 | Ikeda et al. |
| 2012/0115009 A1 | 5/2012 | Okuno et al. |
| 2012/0177974 A1 | 7/2012 | Nakajima et al. |
| 2014/0318418 A1* | 10/2014 | Mathur ................. C09C 1/0093 106/465 |
| 2014/0332746 A1* | 11/2014 | Monaghan ........ H01L 21/28194 257/2 |
| 2015/0295239 A1 | 10/2015 | Harata et al. |
| 2018/0166749 A1 | 6/2018 | Ono et al. |

FOREIGN PATENT DOCUMENTS

| | | |
|---|---|---|
| JP | 2000-077103 A | 3/2000 |
| JP | 2000-340262 A | 12/2000 |
| JP | 2002-025626 A | 1/2002 |
| JP | 2008-100862 A | 5/2008 |
| JP | 2008-103344 A | 5/2008 |
| JP | 2011-210413 A | 10/2011 |
| JP | 2012-104291 A | 5/2012 |
| JP | 2012-146477 A | 8/2012 |
| JP | 2014-022329 A | 2/2014 |
| JP | 2014-075183 A | 4/2014 |
| JP | 2015-230791 A | 12/2015 |
| JP | 2016-018733 A | 2/2016 |
| KR | 10-1478690 B1 | 1/2015 |
| TW | 201533948 A | 9/2015 |
| WO | 2007/049568 A1 | 5/2007 |
| WO | 2010/089898 A1 | 8/2010 |
| WO | 2014/073189 A1 | 5/2014 |
| WO | 2015/072111 A1 | 5/2015 |
| WO | 2016/194995 A1 | 12/2016 |

OTHER PUBLICATIONS

International Search Report issued in corresponding International Patent Application No. PCT/JP2017/007221 dated Apr. 4, 2017.
International Preliminary Report on Patentability and Written Opinion issued in corresponding International Patent Application No. PCT/JP2017/007221 dated Sep. 7, 2018.
Ohta, "Synthetic Mica and its Application," Clay Science, 44: 31-36 (2004) (see partial English translation).

* cited by examiner

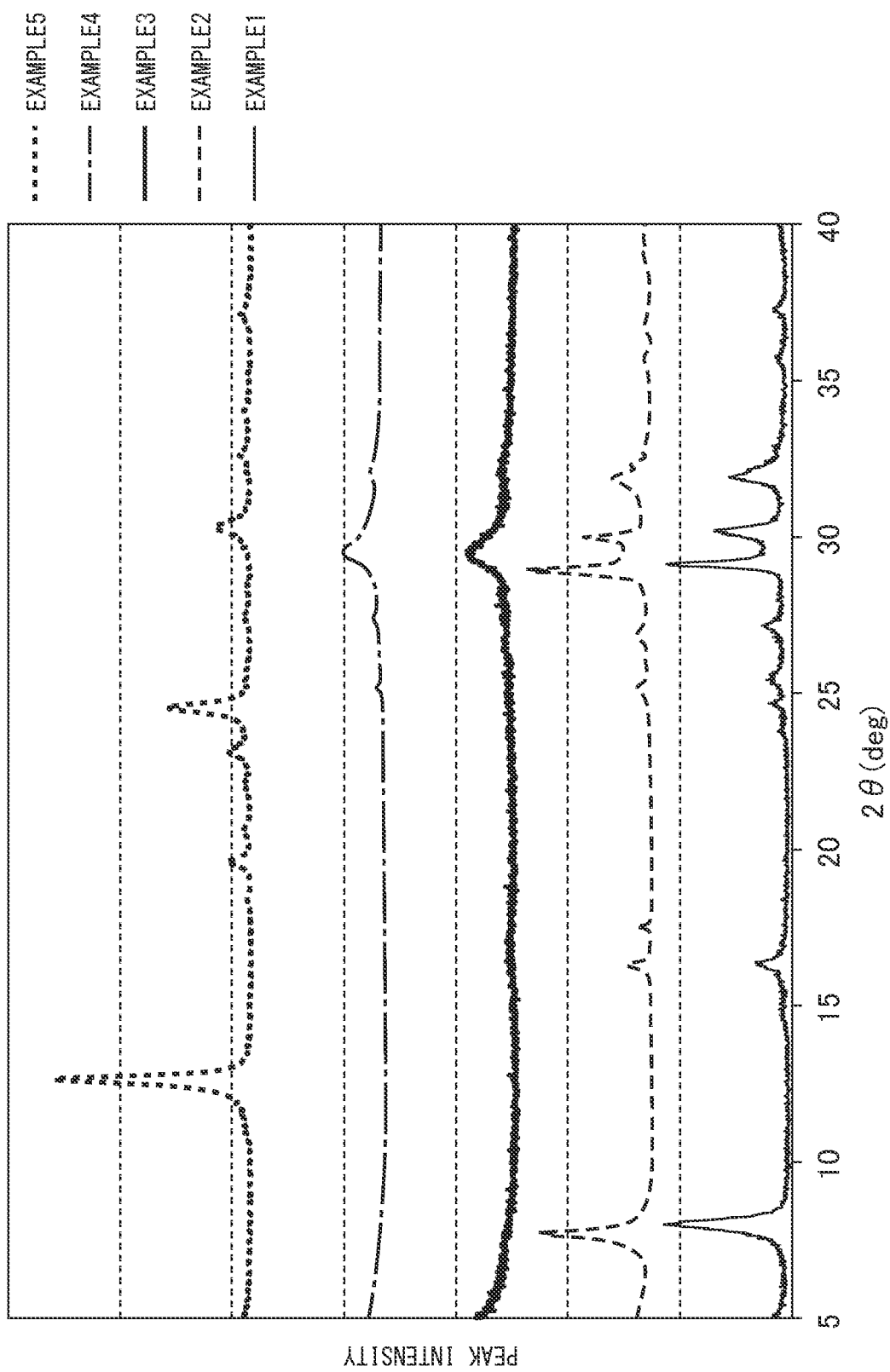

NONAQUEOUS ELECTROLYTE BATTERY INORGANIC PARTICLES AND NONAQUEOUS ELECTROLYTE BATTERY

FIELD

The present invention relates to a nonaqueous electrolyte battery superior in life characteristics or safety.

BACKGROUND

Due to the development of electronic technology, or the growing interest in environmental technology in recent years, various electrochemical devices are used. In particular, requests for energy saving, and expectations for electrochemical devices that can contribute to the above have been increasing more and more.

A lithium ion secondary battery which is a representative example of a power storage device, and also a representative example of a nonaqueous electrolyte battery, has been conventionally used mainly as a power source for a small device, but in recent years, it has drawn attention as a power source for a hybrid vehicle or an electric vehicle.

With respect to a lithium ion secondary battery, increase in energy density is advancing along with enhancement of device performances, and reliability is becoming more important. In particular, in the case of a medium- or large-sized lithium-ion secondary battery such as an automotive onboard power source, it is essential to ensure higher reliability than in the case of small devices.

In a lithium ion secondary battery, a lithium (Li) ion moves between a positive electrode and a negative electrode to carry out charge and discharge. However, it has been known that, if a trace amount of metal ions other than a Li ion is present in the battery, it may deposit on the negative electrode surface to cause reduction in the battery life, or the deposited metal may break a separator and reach the positive electrode to cause a short circuit or deterioration of the safety. Such metal ions are originated from impurities in a battery constituent material, and additionally some are derived by dissolution of a metal included in a positive electrode active material into a nonaqueous electrolyte as the result of a side reaction in the battery (for example, a decomposition reaction of the nonaqueous electrolyte). Further, such metal dissolution is more remarkable when the battery is exposed to a high temperature. For this reason, investigations have been made on a scavenger that captures impurities such as metal ions (see, for example, Patent Literature 1 and 2).

Further, in recent years, a lithium ion battery is required to be charged at a high voltage of 4.35 V or more in order to increase further the energy density. Particularly when it is used as a power source for an electric vehicle, the service environmental temperature of the lithium ion battery may occasionally be 50° C. or even higher. It has been known that, in such a high voltage and high temperature environment, metal dissolution from the positive electrode active material is accelerated and the reduction in battery life is further conspicuous. Therefore, a lithium ion battery needs to maintain a capacity even when charging and discharging are repeated in the environment.

CITATION LIST

Patent Literature

[Patent Literature 1] Japanese Unexamined Patent Publication (Kokai) No. 2000-77103

[Patent Literature 2] Japanese Unexamined Patent Publication (Kokai) No. 2012-146477

SUMMARY

Technical Problem

However, with known scavengers, life characteristics or safety which can withstand practical use has not been obtained. Therefore, an object of the present invention is to provide a nonaqueous electrolyte battery superior in life characteristics or safety.

Solution to Problem

As a result of intensive studies on materials which are able to rid an adverse effect of metal ions dissolved out of an electrode or an electrode active material, the present inventors have found for the first time that the adverse effect of metal ions may be efficiently eliminated by appropriately arranging an inorganic compound with a specific crystal structure and elements, and especially a specific atomic constitution in a battery, thereby completing the invention.

Furthermore, the finding that the inorganic compound with a specific crystal structure and constituent elements does not have influence on a Li ion, which is a main actor for determining battery performance, constitutes one of the major factors for completing the present invention.

The present invention is as follows.

[1]
An inorganic particle for a nonaqueous electrolyte battery, comprising:
a layered compound comprising a metal element having an electronegativity smaller than manganese in a crystal structure of the compound, having an interlayer distance of from 0.40 nm to 2.0 nm and including an exchangeable cation other than a hydrogen ion between layers of the compound.

[2]
The inorganic particle for a nonaqueous electrolyte battery according to [1], wherein the exchangeable cation is selected from the group consisting of an alkali metal ion, an alkaline earth metal ion, an ammonium ion, an organic cation, and any mixture thereof.

[3]
The inorganic particle for a nonaqueous electrolyte battery according to [1] or [2], wherein an adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours.

[4]
The inorganic particle for a nonaqueous electrolyte battery according to any one of [1] to [3], wherein an HF concentration is less than 10 ppm, when 8 parts by weight of the inorganic particle is immersed in 100 parts by weight of a mixed liquid of 800 ppm of HF, 1 mol/L of $LiPF_6$, and a cyclic and/or linear carbonate in an atmosphere at 23° C. for 5 min.

[5]
The inorganic particle for a nonaqueous electrolyte battery according to any one of [1] to [4], wherein the BET specific surface area of the inorganic particle is 3 $m^2/g$ or more.

[6]
The inorganic particle for a nonaqueous electrolyte battery according to any one of [1] to [5], wherein the metal element constituting the inorganic particle and having an electronegativity smaller than manganese is an element of an alkali metal or an alkaline earth metal.

[7]
The inorganic particle for a nonaqueous electrolyte battery according to [6], wherein the inorganic particle is calcium silicate hydrate.

[8]
A battery constituent material comprising the inorganic particle for a nonaqueous electrolyte battery according to any one of [1] to [7].

[9]
A nonaqueous electrolyte battery provided with an adsorptive layer comprising the inorganic particle for a nonaqueous electrolyte battery according to any one of [1] to [7].

[10]
The nonaqueous electrolyte battery according to [9] comprising a positive electrode, a negative electrode, and a separator as battery constituent materials, wherein the adsorptive layer is formed at least inside the separator, on facing surfaces of the positive electrode and the separator, or on facing surfaces of the negative electrode and the separator, and the formed adsorptive layer is formed entirely or partially inside the separator, or entirely or partially on any of the respective facing surfaces.

[11]
A mixture of inorganic particles for a nonaqueous electrolyte battery, comprising a first inorganic particle and a second inorganic particle,
wherein the first inorganic particle comprises a layered compound comprising a metal element having an electronegativity smaller than manganese in a crystal structure of the compound, having an interlayer distance of from 0.40 nm to 2.0 nm and including an exchangeable cation between layers of the compound, and
wherein the second inorganic particle has an average particle diameter larger than the average particle diameter of the first inorganic particle.

[12]
The mixture of inorganic particles for a nonaqueous electrolyte battery according to [11], wherein the average particle diameter of the first inorganic particle is from 0.01 µm to 2 µm, and the average particle diameter of the second inorganic particle is from 0.1 µm to 3 µm.

[13]
The mixture of inorganic particles for a nonaqueous electrolyte battery according to [11] or [12], wherein the shape of the second inorganic particle is plate-like.

[14]
The mixture of inorganic particles for a nonaqueous electrolyte battery according to any one of [11] to [13], wherein with respect to the first inorganic particle, an adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours.

[15]
The mixture of inorganic particles for a nonaqueous electrolyte battery according to any one of [11] to [14], wherein with respect to the first inorganic particle, an HF concentration is less than 10 ppm, when 8 parts by weight of the inorganic particle is immersed in 100 parts by weight of a mixed liquid of 800 ppm of HF, 1 mol/L of $LiPF_6$, and a cyclic and/or linear carbonate in an atmosphere at 23° C. for 5 minutes.

[16]
A battery constituent material comprising the mixture of inorganic particles for a nonaqueous electrolyte battery according to any one of [11] to [15].

[17]
A nonaqueous electrolyte battery provided with an adsorptive layer comprising the mixture of inorganic particles for a nonaqueous electrolyte battery according to any one of [11] to [15].

[18]
The nonaqueous electrolyte battery according to [17] comprising a positive electrode, a negative electrode, and a separator as battery constituent materials, wherein the adsorptive layer is formed at least inside the separator, on facing surfaces of the positive electrode and the separator, or on facing surfaces of the negative electrode and the separator, and the formed adsorptive layer is formed entirely or partially inside the separator, or entirely or partially on any of the respective facing surfaces.

[19]
A nonaqueous electrolyte battery comprising a layered compound, wherein a retention rate of the discharge capacity is 90% or more after repetition of 40 cycles of charge and discharge at a voltage of from 3.0 V to 4.35 V and a temperature of 50° C. or higher.

[20]
The nonaqueous electrolyte battery according to [19], wherein the retention rate of the discharge capacity is 75% or more after repetition of 60 cycles of the charge and discharge.

[21]
The nonaqueous electrolyte battery according to [19], wherein the retention rate of the discharge capacity is 60% or more after repetition of 100 cycles of the charge and discharge.

[22]
The nonaqueous electrolyte battery according to any one of [19] to [21], wherein the layered compound comprises a metal element having an electronegativity smaller than manganese in a crystal structure of the compound, and has an interlayer distance of from 0.40 nm to 2.0 nm, and further includes an exchangeable cation between layers of the compound.

Advantageous Effects of Invention

According to the present invention, it is possible to provide a nonaqueous electrolyte battery superior in the life characteristics or safety.

BRIEF DESCRIPTION OF DRAWINGS

FIG. 1 is a diagram illustrating X-ray diffraction patterns of calcium silicate hydrates obtained in Examples 1 to 4, and zirconium phosphate obtained in Example 5, respectively.

DESCRIPTION OF EMBODIMENTS

Embodiments for implementing the present inventions (hereinafter simply referred to as "embodiments") will be described below in detail. The following embodiments are just examples for explaining the present invention and are not intended to limit the present invention to the following contents. The present invention may be implemented with appropriate modifications within the scope of its gist.

A nonaqueous electrolyte battery inorganic particle related to the first embodiment contains a layered compound comprising a metal element having an electronegativity smaller than manganese in the crystal structure, with an interlayer distance of from 0.40 nm to 2.0 nm, and containing an exchangeable cation other than a hydrogen ion between the layers. In the first embodiment, since an exchangeable cation in a layered compound is other than a hydrogen ion, in the case of zirconium phosphate the exchangeable cation is preferably replaced with one other than hydrogen.

A mixture of nonaqueous electrolyte battery inorganic particles of the second embodiment is a mixture of a first inorganic particle and a second inorganic particle, wherein the first inorganic particle is the layered compound of the first embodiment, and the average particle diameter of the second inorganic particle is larger than the average particle diameter the first inorganic particle.

A nonaqueous electrolyte battery of the third embodiment contains a layered compound, and exhibits a retention rate of the discharge capacity of 90% or more after repetition of 40 cycles of charge and discharge at a voltage of from 3.0 V to 4.35 V and a temperature of 50° C. or higher. The constitution of a nonaqueous electrolyte battery which is superior in life characteristics or safety may be specified by the layered compound and the retention rate of the discharge capacity of 90% or more after repetition of 40 cycles. Concerning charge and discharge of a nonaqueous electrolyte battery, it is preferable that the retention rate of the discharge capacity after repetition of 60 cycles is 75% or more, and more preferable that the retention rate of the discharge capacity after repetition of 100 cycles is 60% or more.

The constituent elements of the above described embodiments will be described below.

[Nonaqueous Electrolyte Battery]

A nonaqueous electrolyte battery is provided with battery constituent materials, such as a positive electrode, a negative electrode, a separator, a nonaqueous electrolytic solution, and an outer package, and at least one of the battery constituent materials contains a nonaqueous electrolyte battery inorganic particle (hereinafter referred to as "first inorganic particle"), which adsorbs a material having an influence on the life characteristics or safety of a nonaqueous electrolyte battery. The first inorganic particle may be also used as an adsorbent capable of adsorbing a material having an influence on the life characteristics or safety of a nonaqueous electrolyte battery.

With respect to the battery constituent materials, for example, for a packaging material or an outer package, aluminum, etc., may be used, for a positive electrode active material, nickel, cobalt, manganese, iron, zinc, copper, aluminum, etc., may be used, and for a current collector foil, copper, aluminum, etc., may be used.

The first inorganic particle included in the constituent materials of a nonaqueous electrolyte battery is a non-metallic layered compound, which contains a metal element having an electronegativity smaller than manganese at least in the crystal structure, has an interlayer distance of from 0.40 nm to 2.0 nm, and contains an exchangeable cation between layers.

The non-metallic layered compound has no effect on a Li ion, which is a main actor for determining battery performances.

With respect to the crystal structure of the first inorganic particle, since it has a layered structure, it is possible to adsorb efficiently a trace amount of a dissolved metal ion other than a lithium ion selectively. As for a specific mechanism therefor, although it is a mere speculation, with a layered structure, a specific surface area for the metal ion increases, so that the adsorption site for the metal ion conceivably expands. Further, the layered structure conceivably contributes to stabilization of an adsorbed ion. Since a dissolved ion to be adsorbed is a divalent or higher metal ion, while the Li ion, which is a main actor for determining battery performances, is monovalent, the Li ion is conceivably adsorbed on a layered compound less easily than the dissolved ion to be adsorbed, so that the layered compound adsorbs selectively the dissolved ion.

In particular, while the interlayer distance of a layered compound is defined as the interplanar spacing measured by X-ray diffraction or electron beam diffraction, it has been found that insofar as the distance is from 0.40 nm to 2.0 nm, a metal ion may be adsorbed efficiently. The lower limit thereof is preferably 0.50 nm or more from the viewpoint of suppression of adsorption, and more preferably 0.80 nm or more. The upper limit thereof is preferably 1.8 nm or less from the viewpoint of adsorption of a dissolved ion, and more preferably 1.5 nm or less. The interplanar spacing need not have a uniform interplanar spacing, and may fluctuate within the above ranges. In other words, a peak corresponding to an interlayer distance by X-ray diffraction or electron beam diffraction is preferably broad, and may have double peaks or triple peaks. The interlayer distance of such a layered compound with a fluctuation in the interplanar spacings may be measured from, for example, a TEM (transmission electron microscope) image.

The layered structure of a layered compound is a structure in which an exchangeable cation is retained between a plurality of layers in the crystal structure. Examples of an element of the exchangeable cation may include a hydrogen ion, an ammonium ion, and a metal ion. As for the metal ion, it is preferable that a metal ion diffusing from the adsorbent is stable, and more preferable that it is an element belonging to an alkali metal ion or an alkaline earth metal ion. Examples of an alkali metal and an alkaline earth metal include Be, Mg, Ca, Sr, Ba, Li, Na, K, Rb, and Cs.

Part of exchangeable cations retained between a plurality of layers in the crystal structure may be replaced with water, or replaced with an organic molecule that is not ionized.

When an exchangeable cation is any of the above described elements, such an exchangeable cation diffuses into an electrolytic solution as a cation, and a vacant site formed in an adsorbent is charged negatively to adsorb a metal ion dissolved from a battery constituent material, such as a positive electrode active material, and a current collector foil. An exchangeable cation having an electronegativity smaller than a dissolved metal ion diffuses into the electrolytic solution to cause ion exchange, by which a dissolved metal ion is adsorbed, so that the charge balance of the whole system inside a battery is maintained. As a result, the potential of the whole system inside a battery is more stable after adsorption. Consequently, the quantity of metal ions dissolved from a battery constituent material may be reduced.

A layered compound need only include in advance a metal element having an electronegativity lower than a metal ion dissolved from a battery constituent material in the crystal structure of an adsorbent.

This means is preferable, because even when, if by any chance, exchangeable cations in a layered compound are consumed totally, metals dissolving from another battery constituent material may be reduced efficiently.

The above may presumably occur because the metal element contained in the crystal structure of the layered compound is more stable as a cation compared to a metal ion dissolved from another battery constituent material, and able to diffuse easily into an electrolytic solution.

As a metal element having a low electronegativity, one having an electronegativity lower than that of manganese, which has the smallest electronegativity among the battery constituent materials, is preferable. In particular, an element to be contained in the crystal structure of an inorganic particle is preferably divalent or more when ionized. By doing so, a metal element having an electronegativity lower than manganese is apt to remain in the crystal structure of an inorganic particle compared to lithium which is monovalent. As a result, only an exchangeable cation is adsorbed based on ion exchange, and only a metal ion dissolved from a battery constituent material may be adsorbed effectively.

Examples of the metal element having an electronegativity smaller than manganese include Nb, Ta, Ti, Zr, Hf, Sc, Y, lanthanoids, Be, Mg, Ca, Sr, and Ba.

In this regard, electronegativity means herein that defined as Pauling electronegativity.

A nonaqueous electrolyte battery preferably contains the first inorganic particle, in which the adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours.

The adsorption rate of $Mn^{2+}$ ions is calculated by dividing the difference between the initial Mn concentration in a mixed liquid and the Mn concentration in the filtrate, which is obtained by immersing the first inorganic particle in the mixed liquid under the above conditions, and undergoing filtration, by the initial Mn concentration, and then multiplying the quotient by 100.

The constitution of a nonaqueous electrolyte battery superior in the life characteristics or safety may be specified by inclusion in a battery of the first inorganic particle capable of selectively adsorbing a trace amount (for example, concentration at ppm level) of $Mn^{2+}$ ions even in a situation where Li ions are excessively present as the first inorganic particle described above.

Examples of the first inorganic particle, in which the adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours, include materials containing an element such as Nb, Ta, Ti, Zr, Hf, Sc, Y, lanthanoids, Be, Mg, Ca, Sr, and Ba. Among them calcium silicate hydrate or zirconium phosphate is particularly preferable.

The cyclic and/or linear carbonate is as described below as a nonaqueous solvent used for a nonaqueous electrolyte.

The mixed liquid for measuring the adsorption rate of $Mn^{2+}$ ions is preferably prepared by dissolving $LiPF_6$ to 1 mol/L in a mixed solvent obtained by mixing ethylene carbonate (EC) and ethyl methyl carbonate (EMC) at a volume ratio of 1/2, and then dissolving manganese trifluoromethanesulfonate $[Mn(CF_3SP_3)_2]$ such that the concentration of Mn is 5 ppm.

The conditions for measuring the adsorption rate of $Mn^{2+}$ ions of the first inorganic particle are explained in detail in Examples.

In addition, it is more preferable that the first inorganic particle is capable of removing hydrogen fluoride (HF) which is a decomposition product of a nonaqueous electrolyte. When HF has been removed effectively, dissolution of a metal from a battery constituent material, such as a positive electrode active material, and a current collector foil, by HF may be suppressed. For the sake of effective removal of HF, an element able to form a stable fluoride is preferable among metal elements having an electronegativity smaller than manganese, and specific examples of such an element include Ti, Zr, Hf, Sc, Y, lanthanoids, Be, Mg, Ca, Sr, and Ba. Although an inorganic particle containing a metal element having an electronegativity smaller than manganese in the crystal structure exhibits a high metal ion adsorptive capacity, for a higher adsorptive capacity, among the above elements, one having a lower electronegativity is preferable, an element belonging to the alkali metals or the alkaline earth metals is more preferable, an element belonging to the alkaline earth metals is further preferable, and Be, Mg, Ca, Sr, and Ba are especially preferable.

In order to stably adsorb metal ions and remove HF in an electrolytic solution, it is preferable that the first inorganic particle contains an oxygen atom in the crystal structure, and more preferable that a metal element having an electronegativity smaller than manganese in the crystal structure is bonded to the oxygen atom.

Furthermore, in order to stably adsorb metal ions and remove HF in the electrolytic solution, it is preferable that the first inorganic particle contain silicon atoms in the crystal structure, and are contained in the crystal structure, and more preferable that the silicon element in the crystal structure is bonded to the oxygen atom.

From such a viewpoint, it is preferable that the HF concentration is less than 10 ppm, when 8 parts by weight of an inorganic particle is immersed in 100 parts by weight of a mixed liquid of 800 ppm of HF, 1 mol/L of $LiPF_6$, and a cyclic and/or linear carbonate in an atmosphere at 23° C. for 5 min.

The cyclic and/or linear carbonate is as described below as a nonaqueous solvent used for a nonaqueous electrolyte. A mixed liquid used for measuring the HF concentration is preferably formed by dissolving $LiPF_6$ into a concentration of 1 mol/L in a mixed solvent prepared by mixing ethylene carbonate (EC) and ethyl methyl carbonate (EMC) at a volume ratio of 1/2, and further dissolving HF to a concentration of 800 ppm. The conditions for measuring the HF concentration when the first inorganic particle is immersed in the mixed liquid will be explained in detail in Examples.

It is preferable that an element having an electronegativity smaller than manganese is contained at a molar ratio of 0.2 to 0.8 with respect to 1 mol of an inorganic particle. The lower limit thereof is more preferably 0.25 or more, and further preferably 0.3 or more. The upper limit thereof is preferably 0.75 or less, and more preferably 0.7 or less.

The first inorganic particle is preferably nonmetallic, namely a semiconductor or an insulator. In particular, its electrical resistivity is preferably $10^3$ Ω·m or higher. A semiconductor or an insulator having an electrical resistivity of $10^3$ Ω·m or higher does not deteriorate charge and discharge characteristics or safety of a battery therefore is preferable.

The average secondary particle diameter (D50) of the first inorganic particle is preferably from 0.05 μm to 4.0 μm. The lower limit thereof is more preferably 0.1 μm or more, and further preferably 0.2 μm or more. The upper limit thereof is more preferably 3.5 μm or less, and further preferably 3.0 μm or less. When the average secondary particle diameter is adjusted within the above range, the energy density of a nonaqueous electrolyte battery tends to increase. Although there is no particular restriction on the primary particle diameter, it is preferably from 10 nm to 2.0 μm.

When the first inorganic particle is brought into contact with water, the swelling power is preferably 10 mL/2 g or less. The swelling power is evaluated as an undisturbed sedimentation volume occupied by 2 g of a sample which has been swollen by absorbing water in 100 mL of purified water. When the swelling power is 10 mL/2 g or less, the first inorganic particle may be used without inviting deterioration of battery characteristics due to swelling by absorbing moisture or an electrolytic solution present in a battery, and therefore.

There is no particular restriction on the method for controlling the average secondary particle diameter (D50) of the first inorganic particle into the range of 0.05 μm to 4.0 μm, and examples thereof may include a conventionally known method, such as an axial type milling method, an annular type milling method, a roller milling method, a ball milling method, a jet milling method, a rotary container type compression and shear milling method, and a pulverizing method in a porcelain mortar.

The shape of the first inorganic particle may be, for example, spherical, plate-like, acicular, and preferably plate-like, or acicular, and there is no particular restriction on the aspect ratio.

The BET specific surface area of the first inorganic particle is preferably 3 $m^2/g$ or more. When the BET specific surface area is 3 $m^2/g$ or more, it is possible to improve further the life characteristics or safety of a nonaqueous electrolyte battery. Further, the BET specific surface area is more preferably 3 $m^2/g$ or more, and 2000 $m^2/g$ or less. When the BET specific surface area exceeds 2000 $m^2/g$, the first inorganic particle tends to aggregate, and the energy density of the nonaqueous electrolyte battery tends to decrease.

In a case in which the first inorganic particle is used as a material for a nonaqueous electrolyte battery, it needs a hardness not less than a certain value so that the particle is not deformed or crushed by an external force such as compression of a battery, and stable adsorption performance is exhibited. From the above viewpoint, the Mohs hardness of the first inorganic particle preferably exceeds 1.

There is no particular restriction on a specific first inorganic particle usable as an adsorbent, namely a non-metallic layered compound containing a metal element having an electronegativity smaller than manganese at least in the crystal structure, having an interlayer distance of from 0.40 nm to 2.0 nm, and including an exchangeable cation between the layers, and for example a material that selectively adsorbs a trace amount of a metal ion other than a lithium ion, and a material that exhibits adsorptive capacity on hydrofluoric acid (HF) are preferable. More specific examples thereof include calcium silicate hydrate, zirconium phosphate, titanium phosphate, a titanate, a niobate, and a niobate titanate.

The first inorganic particles described above may be used singly, or two or more thereof may be used in combination.

The first inorganic particle used as an adsorbent may be able to reduce an adverse effect of a dissolved metal ion more effectively, when it is located in a nonaqueous electrolyte battery including an outer package, a positive electrode, a negative electrode, and a separator, at any position between the positive electrode and the negative electrode. Therefore, an adsorbent containing the first inorganic particle is preferably contained in the positive electrode, the negative electrode, and the separator, and from the viewpoint of versatility in the manufacturing process of the nonaqueous electrolyte battery more preferably in the separator.

A nonaqueous electrolyte battery more preferably contains calcium silicate hydrate, or zirconium phosphate in the battery among the first inorganic particles listed above from the viewpoint of improvement of the life characteristics or safety.

In a nonaqueous electrolyte battery, at least one of the positive electrode, the negative electrode, the nonaqueous electrolyte, the separator, and the outer package preferably contains the first inorganic particle as an adsorbent or an adsorptive layer.

The first inorganic particle may be contained in only one of these battery constituent materials, or may be contained in two or more thereof.

[Calcium Silicate Hydrate]

A calcium silicate hydrate belongs to a material group called as a $CaO/SiO_2/H_2O$ type compound.

As a crystalline calcium silicate hydrate, about 25 kinds including a high temperature phase are known. The calcium silicate hydrate has more preferably a layered structure. Specific examples thereof include a calcium silicate hydrate of tobermorite series, gyrolite series, etc.

Examples of tobermorite series include tobermorite (9 angstrom, 11 angstrom, 14 angstrom, etc.), tacharanite, plombierite, and a low crystallinity calcium silicate hydrate also known as a precursor for tobermorite (hereinafter referred to as "CSH"), and examples of gyrolite series include gyrolite, truscottite, Z-phase formed as an intermediate phase in synthesizing gyrolite. Among them, as a layered calcium silicate hydrate, tobermorite series is preferable.

Identification of tobermorite series among calcium silicate hydrates may be possible by detecting a diffraction peak of the (220) plane at 28 to 30° (2θ) in a diffraction pattern of powder X-ray diffraction.

Among the tobermorite series, one having a low orderliness of the interlayer distance (low crystallinity) is more preferable. There is no particular restriction on such a layered calcium silicate hydrate, and examples thereof include a low crystallinity calcium silicate hydrate (CSH). Since CSH gives a relatively broad diffraction peak in the vicinity of 29.1 to 29.6° (2θ) in a diffraction pattern of powder X-ray diffraction, its existence or nonexistence may be recognized. Although it is not very clear why the layered calcium silicate hydrate having a low orderliness of the interlayer distance (low crystallinity) is able to reduce the adverse effect of a metal ion, it is presumed that the silicate hydrate may act on various kinds of metal ions because the interlayer distance has a spread in distribution. The orderliness (crystallinity) of the interlayer distance appears, for example, as the intensity of the diffraction peak derived from the (002) plane in a powder X-ray diffraction. More specifically, the diffraction peak appears more clearly, as the orderliness of the interlayer distance is higher (higher crystallinity). In other words, a layered calcium silicate hydrate, in which the diffraction peak derived from the (002) plane appearing at 6 to 9° (2θ) in a powder X-ray diffraction is less clear, is more preferable.

More specifically, in the powder X-ray diffraction, the ratio "I (002)/I (220)" of the intensity I (002) of the diffraction peak of the (002) plane appearing at 6 to 9° (2θ) to the intensity I (220) of the diffraction peak of the (220) plane appearing at 28 to 30° (2θ) is preferably 1 or less, more preferably 0.5 or less, and further preferably 0.35 or less. By adjusting the ratio I (002)/I (220) of the diffraction peak intensity I (002) of the (002) plane to the diffraction peak intensity I (220) at such value, the life characteristics or safety of a nonaqueous electrolyte battery tends to be improved.

A calcium silicate hydrate also has water molecules in the crystal. The weight content of the water molecules contained in the crystal may be measured, for example, by a thermal analysis method, specifically TG-DTA (simultaneous differential thermal and thermogravimetric measurement), from an endothermic peak at inclusion of hydrated water near 100° C. to 300° C., and recognized weight reduction of water molecules. However, there is no particular restriction on the content of water molecules present in the crystal of calcium silicate, because the function as an adsorbent is not affected insofar as the interlayer distance is from 0.40 nm to 2.0 nm. Examples of a method of dehydration include dehydration by a solvent, and dehydration by a heat treatment. Further, an empty adsorption site on a calcium silicate hydrate vacated by dehydration may be replaced with an organic molecule or a metal ion.

Part of Ca or Si element in a calcium silicate hydrate may be replaced with another element. There is no particular restriction on a replacing element, and for example in the case of tobermorite series part of the Si element may be replaced with Al element and at the same time Na element or K element may be introduced for charge compensation. In this case, it is preferable to use one that gives a diffraction peak of the (220) plane at 28 to 30° (2θ) in a diffraction pattern of powder X-ray diffraction.

In order to maintain the crystal structure, the amount of replacement to another element is preferably 40 mol % or less with respect to the total amount of Si and Al elements before replacement.

The average secondary particle diameter (D50) of a calcium silicate hydrate is preferably from 0.05 μm to 4.0 μm, more preferably from 0.1 μm to 3.5 μm, and further preferably from 0.2 μm to 3.5 μm. When the average secondary particle diameter is adjusted into the above range, the energy density of a nonaqueous electrolyte battery tends to increase. Although there is no particular restriction on the primary particle diameter, it is preferably from 10 nm to 2.0 μm.

There is no particular restriction on the method for adjusting the average secondary particle diameter (D50) of a calcium silicate hydrate into the above range, and a conventionally known method, such as an axial type milling method, an annular type milling method, a roller milling method, a ball milling method, a jet milling method, a rotary container type compression and shear milling method, and a pulverizing method in a porcelain mortar, may be applied.

Although not prerequisite, a calcium silicate hydrate may be post-treated by an acid treatment, an alkali treatment, or the like.

Although not prerequisite, a calcium silicate hydrate may also contain another component. The content of such other component may be in a range of 0 to 50%. There is no particular restriction on such other component, insofar as the chemical structure or crystal structure of the calcium silicate hydrate is maintained, and for example a desiccant such as silica gel may be contained for moisture control.

The BET specific surface area of a calcium silicate hydrate is preferably 10 $m^2/g$ or more. When the BET specific surface area is 10 $m^2/g$ or more, the life characteristics or safety of a nonaqueous electrolyte battery may be further improved. The BET specific surface area is more preferably from 10 $m^2/g$ to 2000 $m^2/g$. When the BET specific surface area exceeds 2000 $m^2/g$, the calcium silicate hydrate tends to aggregate and the energy density of a nonaqueous electrolyte battery tends to decrease.

There is no particular restriction on the method of producing a calcium silicate hydrate, and a conventionally known method may be applied. For example, a hydrothermal synthesis, in which a siliceous raw material and a calcareous raw material are dispersed in water and then matured under high temperature and high pressure conditions, is applicable.

A siliceous raw material means a raw material in which the content of $SiO_2$ is 50 weight-% or more. Examples thereof include crystalline silica stone, silica sand, and a rock with a high quartz content, and natural clay minerals, such as diatomaceous earth, silica fume, fly ash, and kaolinitic clay, and montmorillonitic clay, as well as burned products thereof. As a siliceous raw material, an aqueous solution of silicic acid such as water glass may be also used.

A calcareous raw material means a raw material containing 50 weight-% or more of CaO in terms of oxide, and refers to quicklime, slaked lime, and the like. Further, as a calcareous raw material, a calcium-containing high purity nitrate, sulfate, acetate, chloride, and the like may be used. In addition to these, a calcium-based cement containing calcium as a main component, namely ordinary portland cement, high-early-strength portland cement, belite cement, various alumina cements, etc., may be used as a calcareous raw material.

When a crystalline, layered calcium silicate hydrate, such as tobermorite, and gyrolite, is synthesized, maturation may be carried out in saturated steam near 150° C. to 250° C. as hydrothermal synthesis conditions, namely maturation using an autoclave may be applicable. The synthesis temperature for synthesizing a low crystallinity calcium silicate hydrate (CSH) is preferably 150° C. or less, more preferably 100° C. or less, and further preferably around room temperature.

It has been reported that CSH is in general a main component of a cement hardened body obtained by hydrating portland cement or the like. In other words, a hydrate obtained by hydration of cement as CSH may be used as a calcium silicate hydrate. In this case, a sufficiently hydrated hardened body is crushed by the above-described method, and the crushed product may be used as it is.

Next, the Ca/Si element ratio (hereinafter simply referred to as "C/S ratio") of a calcareous raw material (CaO) for a calcium silicate hydrate to a siliceous raw material ($SiO_2$) will be described.

The C/S ratio of a calcium silicate hydrate is preferably from 0.3 to 2.0. When the C/S ratio is 0.3 or more, the lifespan characteristic life characteristics or safety of a nonaqueous electrolyte battery tends to be further improved. However, when the C/S ratio exceeds 2.0, it is difficult to form a layered structure, and therefore the adsorption capacity that eliminates an adverse effect of a dissolved metal ion tends to decrease. The C/S ratio is more preferably from 0.6 to 2.0.

A C/S ratio of a calcium silicate hydrate may be measured by a general elemental analysis method, for example, by carrying out an ICP emission spectroscopic analysis after decomposition of the hydrate with an acid such as nitric acid.

The calcium silicate hydrates described above may be used singly, or two or more thereof may be used in combination.

In this regard, when a calcium silicate hydrate is present at an optional position between the positive electrode and the negative electrode inclusive of the positive electrode, the negative electrode, and the separator in a nonaqueous electrolyte battery, an adverse effect of a deposited metal ion may be reduced more effectively. Therefore, a calcium silicate hydrate is preferably contained in the positive electrode, the negative electrode, or the separator, and more preferably in the separator, because it is superior in versatility of manufacturing processes of a nonaqueous electrolyte battery.

[Zirconium Phosphate]

Zirconium phosphates include one with an amorphous structure, and one with a crystalline, layered structure or network structure. Among them, the zirconium phosphate $Zr_2(HPO_4)_2 \cdot nH_2O$, which is a layered zirconium phosphate having a layered structure, is preferable, because it is superior in metal adsorptive capacity, and HF removal ability.

In a zirconium phosphate, Zr element, part of P element, and part and/or entire H element may be replaced with other elements. With regard to the replacement element, there is no particular restriction, insofar as the interlayer distance is from 0.40 nm to 2.0 nm, and an exchangeable cation may be retained between the layers, and, for example, part of the Zr element may be replaced with Hf element. Through replacement of part of the Zr element with Hf element, the metal adsorption capacity may be enhanced. Further, part and/or entire H element may be replaced with an alkali metal such as a Li ion, or a monovalent cation, such as an ammonium ion, and an oxonium ion. By replacing H element with a Li ion, the life characteristics or safety of a nonaqueous electrolyte battery may be improved.

A zirconium phosphate contains water molecules in the crystal. The weight content of the water molecules contained in the crystal may be measured, for example, by a thermal analysis method, specifically TG-DTA (simultaneous differential thermal and thermogravimetric measurement), from an endothermic peak at inclusion of hydrated water near 100° C. to 300° C., and recognized weight reduction of water molecules. However, there is no particular restriction on the content of water molecules present in the crystal of zirconium phosphate, because the function as an adsorbent is not affected insofar as the interlayer distance is from 0.40 nm to 2.0 nm. Examples of a method of dehydration include dehydration by a solvent, and dehydration by a heat treatment. Further, an empty adsorption site on zirconium phosphate vacated by dehydration may be replaced with an organic molecule or a metal ion.

There is no particular restriction on the method of producing zirconium phosphate, and a conventionally known method may be applied. Examples thereof include a wet method in which raw materials are mixed in water, and then heated under normal pressure for synthesis, and a hydrothermal method in which raw materials are mixed in water or in a state containing water, and then pressurized and humidified for synthesis.

Specifically, by the production method of a wet process synthesis is carried out by mixing an aqueous solution containing a zirconium compound and an aqueous solution containing phosphoric acid and/or a salt thereof to form a precipitate, and maturing the same.

In the production process, an oxalic acid compound may be optionally added. By adding the oxalic acid compound, production is faster and more efficient.

The maturation may be carried out at room temperature, but in order to accelerate the maturation, it should preferably be carried out in a wet and atmospheric environment at 90° C. or higher, or it may be carried out under a hydrothermal condition, namely under a pressure higher than normal pressure and a temperature exceeding 100° C. When a layered zirconium phosphate is produced under hydrothermal conditions, it should preferably be carried out at 130° C. or less from the viewpoint of production cost.

There is no particular restriction on the time for producing zirconium phosphate, insofar as the layered structure may be obtained. For example, zirconium phosphate is obtained by mixing phosphoric acid and/or a salt thereof with a zirconium compound to form a precipitate, and then maturing the same. The time for maturation varies depending on the temperature, and in the case of 90° C., it is preferably 4 hours or more. The maturation time is preferably 24 hours or less from the viewpoint of productivity.

The produced zirconium phosphate is filtered, washed thoroughly with water, dried, and crushed to obtain fine particles of zirconium phosphate.

Examples of a zirconium compound that may be used as a raw material for synthesizing zirconium phosphate include zirconium nitrate, zirconium acetate, zirconium sulfate, zirconium carbonate, basic zirconium sulfate, zirconium oxysulfate, and zirconium oxychloride; and zirconium nitrate, zirconium acetate, zirconium sulfate, and zirconium carbonate are preferable, and zirconium oxychloride is more preferable in consideration of reactivity and economy.

Examples of phosphoric acid or a phosphate that may be used as a raw material for synthesizing a layered zirconium phosphate include phosphoric acid, sodium phosphate, potassium phosphate, and ammonium phosphate; and phosphoric acid is preferable, and a high concentration phosphoric acid with a weight concentration of approx. from 75% to 85% is more preferable Examples of an oxalic acid compound that may be used as a raw material for synthesizing zirconium phosphate include oxalic acid dihydrate, ammonium oxalate, and ammonium hydrogen oxalate, and oxalic acid dihydrate is more preferable.

The blending ratio of various raw materials for synthesizing zirconium phosphate will be described below.

The blending ratio of phosphoric acid or phosphate in the initial charge is preferably 2 to 3, more preferably 2.1 to 2.6, in terms of molar ratio with respect to the zirconium compound. When the ratio is in the range, a layered zirconium phosphate is produced with high yield.

The blending ratio of oxalic acid in the initial charge is preferably from 2.5 to 3.5, and more preferably from 2.8 to 3.0, in terms of molar ratio with respect to the zirconium compound. By satisfying the ratio, production of zirconium phosphate is easier.

The solid content concentration in a reaction slurry at the time of producing zirconium phosphate is preferably 3 weight-% or more, and more preferably from 7% to 15% in consideration of production cost.

The average secondary particle diameter (D50) of zirconium phosphate is preferably from 0.05 µm to 4.0 µm, more preferably from 0.1 µm to 3.5 µm, and further preferably from 0.2 µm to 3.0 µm. When the average secondary particle diameter (D50) is adjusted within the above range, the energy density of a nonaqueous electrolyte battery tends to increase.

There is no particular restriction on the method for regulating the average secondary particle diameter of zirconium phosphate within the above range, and the aforementioned method for regulating the average secondary particle diameter of a calcium silicate hydrate may be applied in the same manner.

Zirconium phosphate may be post-treated by a method, such as an acid treatment, or an alkali treatment, however without limitation thereto.

Zirconium phosphate may also contain another component, however without limitation thereto. The content of such other component may be in the range of 0 to 50%. There is no particular restriction on such other component, insofar as the chemical structure or crystal structure of a layered zirconium phosphate is maintained, and for example a desiccant such as silica gel may be contained for moisture control.

The BET specific surface area of a zirconium phosphate is preferably 3 $m^2/g$ or more. When the BET specific surface area is 3 $m^2/g$ or more, it is possible to improve further the life characteristics or safety of a nonaqueous electrolyte battery. Further, the BET specific surface area is more preferably from 10 $m^2/g$ to 2000 $m^2/g$. When the BET specific surface area exceeds 2000 $m^2/g$, a zirconium phosphate tends to aggregate, and the energy density of a nonaqueous electrolyte battery tends to decrease.

[Second Inorganic Particle]

In the second embodiment, the layer containing the first inorganic particle, which is a nonaqueous electrolyte battery inorganic particle, preferably further contains a second inorganic particle. The nonaqueous electrolyte battery inorganic particle adsorbs a metal in the battery to extend the life of the nonaqueous electrolyte battery and improve the safety. However, when the particles are aggregated, the contact area with an electrolytic solution decreases, making it difficult to exhibit satisfactory metal adsorption characteristics. For preventing the above, it is preferable to mix the second inorganic particle with the inorganic particle for a non-aqueous electrolyte battery. By mixing the second inorganic particle with the inorganic particle for a non-aqueous electrolyte battery, aggregation of the nonaqueous electrolyte battery inorganic particle may be prevented so that the adsorption characteristics may be fully exhibited to develop satisfactory metal adsorption characteristics.

The second inorganic particle is preferably nonmetallic, namely a semiconductor or an insulator. In particular, its electrical resistivity is preferably $10^3$ $\Omega \cdot m$ or more. A semiconductor or an insulator having an electrical resistivity of $10^3$ $\Omega \cdot m$ or more is preferred because it does not impair the charge-discharge characteristics or safety in the battery.

From the viewpoint of improving the dispersibility of the first inorganic particle in the above described mixture of the first inorganic particle containing the layered compound and the second inorganic particle, the average particle diameter of the second inorganic particle obtained by an SEM observation is larger than the average particle diameter of the first inorganic particle obtained by an SEM observation.

The average particle diameter of an inorganic particle means herein, when n pieces of inorganic particles are observed with a scanning electron microscope (SEM), the average thickness obtained by dividing the sum of the lengths of the shortest line segment traversing each particle image through its center by n. The average particle diameter of an inorganic particle is calculated by dividing the sum of the thicknesses of 20 pieces of inorganic particles by 20, wherein the thickness of the inorganic particle is obtained, for example, by an SEM observation of a dry powder of inorganic particle, or an SEM observation of a cross section of a coating layer obtained by applying a dispersion containing an inorganic particle to a separator followed by drying.

The "average particle diameter of an inorganic particle" to be obtained by an SEM observation is distinguished herein from the "average secondary particle diameter (D50) of an inorganic particle" to be obtained by a particle size distribution measurement of a dispersion containing an inorganic particle.

From the viewpoint of the dispersibility of the first inorganic particle, the shape of the second inorganic particle is preferably plate-like. From the same viewpoint, regarding a mixture containing the first inorganic particle and the second inorganic particle, it is preferable that the average particle diameter of the first inorganic particle corresponding to a layered compound is from 0.01 µm to 2 µm, and the average particle diameter of the second inorganic particle is from 0.1 µm to 3 µm, and it is more preferable that the average particle diameter of the first inorganic particle is from 0.02 µm to 1 µm, and the average particle diameter of the second inorganic particle is from 0.5 µm to 2 µm.

The average secondary particle diameter (D50) of the second inorganic particle is preferably from 0.1 µm to 5.0 µm. The lower limit thereof is more preferably 0.2 µm or more, and further preferably 0.3 µm or more. Further, the upper limit thereof is more preferably 4.5 µm or less, and further preferably 4.0 µm or less. When the average secondary particle diameter (D50) is adjusted within the above range, the energy density of a nonaqueous electrolyte battery tends to increase. Although there is no particular restriction on the primary particle diameter, it is preferably from 10 nm to 3.0 µm.

There is no particular restriction on the method for controlling the average secondary particle diameter (D50) of the second inorganic particle into the range of 0.1 µm to 5.0 µm, and examples thereof may include a conventionally known method, such as an axial type milling method, an annular type milling method, a roller milling method, a ball milling method, a jet milling method, a rotary container type compression and shear milling method, and a pulverizing method in a porcelain mortar.

The shape of the second inorganic particle may be plate-like, scale-like, acicular, columnar, spherical, polyhedral, massive, and so on. From the viewpoint of the dispersibility of the first inorganic particle, which is a nonaqueous electrolyte battery inorganic particle, the second inorganic particle is preferably plate-like or acicular, but the aspect ratio is unrestricted.

The BET specific surface area of the second inorganic particle is preferably 0.1 $m^2/g$ or more. When the BET specific surface area is 0.1 $m^2/g$ or more, the dispersibility of the first inorganic particle may be further improved. Further, the BET specific surface area is more preferably from 1 $m^2/g$ to 200 $m^2/g$. When the BET specific surface area exceeds 200 $m^2/g$, the second inorganic particle tends to aggregate, and an improvement effect on the life characteristics or safety of the battery tends to decrease.

The second inorganic particles described above may be used singly, or two or more thereof may be used in combination.

The second inorganic particle may be preferably an inorganic particle selected from the group consisting of an anion adsorbent, such as a layered double hydroxide (Mg—Al type, Mg—Fe type, Ni—Fe type, Li—Al type), a layered double hydroxide-alumina silica gel complex, boehmite, alumina, zinc oxide, lead oxide, iron oxide, iron oxyhydroxide, hematite, bismuth oxide, tin oxide, titanium oxide, and zirconium oxide, a cation adsorbent, such as hydroxyapatite, zeolite, a carbonate and sulfate, such as calcium sulfate, magnesium sulfate, aluminum sulfate, gypsum, and barium sulfate, an oxide ceramic, such as alumina trihydrate (ATH), fumed silica, precipitated silica, zirconia, and yttria, a nitride ceramic, such as silicon nitride, titanium nitride, and boron nitride, magnesium hydroxide, silicon carbide, talc, dickite, nacrite, halloysite, pyrophyllite, montmorillonite, sericite, amesite, a layered silicate, such as bentonite, asbestos, diatomaceous earth, glass fiber, a synthetic layered silicate, such as mica or fluoromica, a neutral layered silicate, such as hectorite, saponite, vermiculite, or nanoclay, a natural or synthetic layered silicate containing an improver for improving intercalation and detachment, zinc borate, sodium oxide, potassium oxide, magnesium oxide, calcium oxide, barium oxide, lanthanum oxide, cerium oxide, strontium oxide, vanadium oxide, $SiO_2$—MgO (magnesium silicate), magnesium hydroxide, $SiO_2$—CaO (calcium silicate), hydrotalcite, sodium carbonate, potassium carbonate, magnesium carbonate, calcium carbonate, barium carbonate, lanthanum carbonate, cerium carbonate, basic copper acetate, and basic lead sulfate.

Particularly, the second inorganic particle is preferably an anion adsorbent and/or a basic inorganic particle. When the second inorganic particle is an anion adsorbent, the metal adsorptive capacity of a nonaqueous electrolyte battery inorganic particle is further enhanced. Further, when the second inorganic particle is a basic inorganic particle, HF may be adsorbed more efficiently.

There is no particular restriction on an anion adsorbent, and examples thereof include a layered double hydroxide (Mg—Al type, Mg—Fe type, Ni—Fe type, Li—Al type), a layered double hydroxide-alumina silica gel composite, boehmite, alumina, zinc oxide, lead oxide, iron oxide, iron oxyhydroxide, hematite, bismuth oxide, tin oxide, titanium oxide, and zirconium oxide. From the viewpoint of comparatively low content of moisture and prevention of battery swelling, as the anion adsorbent boehmite, alumina, zinc oxide, lead oxide, iron oxide, iron oxyhydroxide, hematite, lanthanum oxide, bismuth oxide, tin oxide, titanium oxide, cerium oxide, zirconium oxide, etc., are preferable, and as the basic inorganic particle, sodium oxide, potassium oxide, magnesium oxide, calcium oxide, barium oxide, lanthanum oxide, cerium oxide, strontium oxide, vanadium oxide, $SiO_2$—MgO (magnesium silicate), magnesium hydroxide, $SiO_2$—CaO (calcium silicate), hydrotalcite, sodium carbonate, potassium carbonate, magnesium carbonate, calcium carbonate, barium carbonate, lanthanum carbonate, cerium carbonate, basic copper acetate, and basic lead sulfate are preferable. The anion adsorbents and/or basic inorganic particles may be used singly, or two or more thereof may be used in combination.

The first inorganic particle and the second inorganic particle may be distinguished clearly from each, because a first inorganic particle having a small average particle diameter and a layered structure, and a second inorganic particle having a large average particle diameter and not having a layered structure may be clearly discriminated by measuring X-ray, electron beam diffraction, or TEM (transmission electron microscope) on two or more kinds of inorganic particles having different average particle diameters, which are distinguished from each other by a combination of SEM (scanning electron microscope) observation and an EDX (energy dispersive X-ray spectroscopy) analysis.

[Battery Constituent Material]

The battery constituent materials forming a nonaqueous electrolyte battery include a positive electrode, a negative electrode, an electrode terminal, a separator, a nonaqueous electrolyte, a nonaqueous electrolytic solution, a packaging material, and an outer package. A battery constituent material containing a nonaqueous electrolyte battery inorganic particle described above, and a battery constituent material containing a mixture of a nonaqueous electrolyte battery inorganic particle described above (the first inorganic particle), and the second inorganic particle are also an aspect of the present invention.

[Separator]

The separator is only required to have a high ion permeability and a function to isolate electrically the positive electrode and the negative electrode. A conventionally known separator used for a nonaqueous electrolyte battery may be used without any particular restriction.

Specifically, a microporous membrane, or a nonwoven fabric composed of a material, which is stable in a nonaqueous electrolyte in a battery and stable electrically, such as a polyolefin (e.g. polyethylene (PE), polypropylene (PP)), polyester, polyimide, polyamide, and polyurethane, may be used as a separator. It is preferable that the separator has a property of closing the pores (that is, a shutdown function) at 80° C. or higher (more preferably 100° C. or higher), and 180° C. or lower (more preferably 150° C. or lower). Therefore, it is more preferable to use a microporous membrane, or a nonwoven fabric containing a polyolefin having a melting temperature, namely a melting temperature measured with a differential scanning calorimeter (DSC) according to the stipulations of JIS K 7121, of 80° C. or higher (more preferably 100° C. or higher), and 180° C. or lower (more preferably 150° C. or lower) for a separator. In this case, the microporous membrane or the nonwoven fabric to be used as a separator may be constituted solely with PE, or solely of PP, or may include two or more kinds of materials. Further, the separator may be a laminate of a microporous membrane made of PE and a microporous membrane made of PP (for example, PP/PE/PP three-layer laminate), or the like.

As the above-mentioned microporous membrane, for example, an ion-permeable porous membrane (microporous membrane used widely as a separator for a nonaqueous electrolyte battery) having many pores formed by a conventionally known solvent extraction method, dry or wet stretching method, or the like, may be used.

A nonaqueous electrolyte battery separator containing the adsorbent described above (i.e. the nonaqueous electrolyte battery inorganic particle, and the nonaqueous electrolyte battery inorganic particle mixture described above) is also an aspect of the present invention.

In a case where a separator contains the inorganic particle, it is possible not only to form a single layer structure separator by adding the inorganic particle into the above microporous membrane or nonwoven fabric, but also to form a multilayer structure separator using the microporous membrane or the nonwoven fabric as a substrate, and placing a porous layer containing the inorganic particle on either or both sides of the same.

In the above described multilayer structure separator, the microporous membrane or nonwoven fabric as the substrate constitutes a layer having a principal function of a separator that transmits ions while preventing short circuit between a positive electrode and a negative electrode, and the porous layer containing the inorganic particle bears a role of adsorbing metal ions dissolved from a positive electrode active material into a nonaqueous electrolyte. From this viewpoint, a separator in which at least one side of the substrate is provided with a film of the nonaqueous electrolyte battery inorganic particle, or the nonaqueous electrolyte battery inorganic particle mixture is preferable.

Further, in the multilayer structure separator described above, in order to secure the shutdown function, the substrate is preferably a microporous membrane or a nonwoven fabric mainly composed of a polyolefin having the above melting temperature, and is more preferably a microporous membrane mainly composed of a polyolefin having the above melting temperature. In other words, it is particularly preferable that the multilayer structure separator has a porous layer containing an inorganic particle, and a porous layer mainly composed of a polyolefin having the above melting temperature.

In the above-described multilayer structure separator, a microporous membrane or a nonwoven fabric serving as the substrate, and a porous layer containing an inorganic particle may be one body, or each may be an independent membrane, such that they may be combined together in the battery to constitute a separator.

In a multilayer structure separator having a porous layer containing an inorganic particle and a porous layer mainly composed of a polyolefin having the above melting temperature, the content of polyolefin in the total volume of the constituent components (the total volume excluding the pore portion) of the porous layer composed mainly of a polyolefin is preferably 50 volume-% or more, more preferably 70 volume-% or more, and especially preferably 100 volume-% or less.

In a multilayer structure separator having a porous layer containing an inorganic particle and a porous layer mainly composed of a polyolefin having the above melting temperature, the porous layer mainly composed of a polyolefin (especially a microporous membrane) is prone to cause thermal contraction when the temperature inside a battery is high. However, in the separator having the multilayer structure described above, the porous layer containing the inorganic particle resistant to thermal contraction acts as a heat resistant layer, and the thermal contraction of the whole separator may be suppressed, so that a nonaqueous electrolyte battery superior in safety under high temperature may be accomplished.

In using the above-described multilayer structure separator, a layer containing an inorganic particle preferably contains a binder in order to bind inorganic particles together, or bind the layer containing an inorganic particle with a substrate (the nonwoven fabric, or the microporous membrane described above).

There is no particular restriction on the binder, but, for example when a separator is used, it is preferably insoluble or poorly soluble in an electrolytic solution and electrochemically stable. Examples of the binder include, without limitation thereto, a polyolefin, such as polyethylene and polypropylene; a fluorine-containing resin, such as poly(vinylidene fluoride), and polytetrafluoroethylene; a fluorine-containing rubber, such as a vinylidene fluoride/hexafluoropropylene/tetrafluoroethylene copolymer, and an ethylene/tetrafluoroethylene copolymer; a rubber, such as a styrene/butadiene copolymer and a hydrogenated product thereof, an acrylonitrile/butadiene copolymer and a hydrogenated product thereof, an acrylonitrile/butadiene/styrene copolymer and a hydrogenated product thereof, a methacrylic acid ester/acrylic acid ester copolymer, a styrene/acrylic acid ester copolymer, an acrylonitrile/acrylic acid ester copolymer, an ethylene propylene rubber, poly(vinyl alcohol), and poly(vinyl acetate); a cellulose derivative, such as ethylcellulose, methylcellulose, hydroxyethylcellulose, and carboxymethylcellulose; and a resin having a melting point and/or a glass transition temperature of 180° C. or more, such as polyphenylene ether, polysulfone, polyethersulfone, polyphenylsulfone, polyphenylene sulfide, polyetherimide, polyamideimide, and polyester.

Among the above, a resin latex binder is preferable. In this regard, a "resin latex" means herein a resin in a state dispersed in a medium. The ion permeability of a separator having a layer containing an adsorbent and a resin latex binder tends to resist decrease, and high output characteristics are apt to be obtained easily. In addition, even when the temperature rise rate at the time of abnormal heat generation is fast, smooth shutdown performance is exhibited. The resistance to thermal contraction is also high, and high safety tends to be easily obtained.

Although there is no particular restriction on the resin latex binder, examples thereof may include those obtained by an emulsion polymerization of an aliphatic conjugated diene monomer, or an unsaturated carboxylic acid monomer, as well as the same and another monomer copolymerizable with the same. When such a resin latex binder is used, the electrochemical stability and the bonding property tend to be improved. In this regard, there is no particular restriction on an emulsion polymerization method, and a conventionally known method may be used. Further, there is no particular restriction on an addition method for the monomer and other components, and any of a lump addition method, a split addition method, or a continuous addition method may be adopted. Further, any of single-stage polymerization, two-stage polymerization, or multi-stage polymerization may be adopted.

Although there is no particular restriction on the aliphatic conjugated diene monomer, examples thereof include 1,3-butadiene, 2-methyl-1,3-butadiene, 2,3-dimethyl-1,3-butadiene, 2-chloro-1,3-butadiene, a substituted linear conjugated pentadiene, and a substituted side chain conjugated hexadiene. Among these, 1,3-butadiene is preferable. The aliphatic conjugated diene monomers may be used singly, or two or more thereof may be used in combination.

Although there is no particular restriction on the unsaturated carboxylic acid monomer, examples thereof include a mono- or dicarboxylic acid (anhydride), such as acrylic acid, methacrylic acid, crotonic acid, maleic acid, fumaric acid, and itaconic acid. Among these, acrylic acid and/or methacrylic acid is preferable. These carboxylic acid monomers may be used singly, or two or more thereof may be used in combination.

Although there is no particular restriction on other monomer copolymerizable with the aliphatic conjugated diene monomer or the unsaturated carboxylic acid monomer, examples thereof include an aromatic vinyl monomer, a vinyl cyanide monomer, an unsaturated alkyl carboxylate monomer, an unsaturated monomer containing a hydroxyalkyl group, and an unsaturated carboxylic acid amide monomer. Among these, an unsaturated alkyl carboxylate monomer is preferable. These may be used singly, or two or more thereof may be used in combination.

Although there is no particular restriction on the unsaturated alkyl carboxylate monomer, examples thereof include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. Among these, methyl methacrylate is preferable. These may be used singly, or two or more thereof may be used in combination.

In addition to the monomers described above, a monomer component other than those described above may also be used to improve various qualities and physical properties.

The average particle diameter of the resin latex binder is preferably from 50 nm to 500 nm, more preferably from 60 nm to 460 nm, and further preferably from 70 nm to 420 nm. When the average particle diameter is 50 nm or more, the ion permeability of the separator having a layer containing the adsorbent and the resin latex binder resists to decrease, and high output characteristics tend to be easily obtained. In addition, even when the temperature rise at the time of abnormal heat generation is fast, the separator exhibits smooth shutdown performance, and the resistance to thermal contraction is high, and higher safety tends to be obtained.

Further, when the average particle diameter is 500 nm or less, superior binding properties may be developed, and when the separator is formed as a multilayer porous film, the thermal contraction is satisfactory, and higher safety tends to be obtained.

The control of the average particle diameter of the resin latex binder is possible by adjusting a polymerization time, a polymerization temperature, the blend ratio of raw materials, the order of addition of raw materials, pH and the like.

When the separator contains an inorganic particle, the content of the inorganic particle in the separator is preferably 0.1 $g/m^2$ or more in terms of a quantity per unit area of the separator from the viewpoint of favorably securing the effect of its use, and more preferably 0.5 $g/m^2$ or more. However, when the content of the inorganic particle in the separator is too high, the separator is thick, which tends to lead to decrease in energy density of the battery, or to increase in internal resistance. Therefore, the content of the inorganic particle in the separator is preferably, for example, 15 $g/m^2$ or less in terms of a quantity per unit area of the separator, and more preferably 10 $g/m^2$ or less.

Further, when the separator has a porous layer containing an inorganic particle, the content of the inorganic particle in the porous layer with respect to the total volume of the constituent components (the total volume excluding the pore portion) of the porous layer is preferably 1 volume-% or more, and more preferably from 5 volume-% to 100 volume-% from the viewpoint of favorably securing the effect of its use.

Further, an inorganic fine particle other than the first inorganic particle and the second inorganic particle (hereinafter referred to as "other inorganic fine particle") or a resin fine particle may be contained in the separator. When the separator contains the fine particle, for example, the shape stability of the entire separator under high temperature may be further enhanced.

Although there is no particular restriction on other inorganic fine particle, for example, those having a melting point of 200° C. or higher, and high electrical insulation characteristics, and being electrochemically stable in the service range of a nonaqueous electrolyte battery are preferable. Examples of such inorganic particle include, but not particularly limited to, an oxide ceramic, such as alumina, silica, titania, zirconia, magnesia, ceria, yttria, zinc oxide, and iron oxide; a nitride ceramic, such as silicon nitride, titanium nitride, and boron nitride; and ceramics, such as silicon carbide, calcium carbonate, magnesium sulfate, aluminum sulfate, aluminum hydroxide, aluminum hydroxide oxide, talc, dickite, nacrite, halloysite, pyrophyllite, montmorillonite, sericite, bentonite, asbestos, zeolite, anhydrous calcium silicate, magnesium silicate, diatomaceous earth, and silica sand; and glass fiber. The inorganic particles may be used singly, or two or more thereof may be used in combination.

Among these, an aluminum oxide compound, such as alumina, and aluminum hydroxide oxide; or an aluminum silicate compound having no ion exchange ability, such as dickite, nacrite, halloysite, and pyrophyllite is preferable. By using such an inorganic particle, the electrochemical stability and the inhibitory property on thermal contraction of a multilayer porous film tend to be improved.

Further, as the resin fine particle, that composed of a resin which has heat resistance and electric insulation characteristics, and is stable with respect to a nonaqueous electrolyte in a battery, and electrochemically stable such that it is resistant to oxidation and reduction in a range of the operating voltage of the battery. Examples of a resin composing such a resin fine particle include a crosslinked product of at least one resin selected from the group consisting of a styrene resin (polystyrene, etc.), a styrene/butadiene rubber, an acrylic resin (poly(methyl methacrylate), etc.), a poly (alkylene oxide) (poly(ethylene oxide), etc.), and a fluororesin (poly(vinylidene fluoride), etc), as well as derivatives thereof; a urea resin; and polyurethane. For a resin fine particle, the above-exemplified resins may be used singly, or two or more thereof may be used in combination. Further, the resin fine particle may contain, if necessary, a publicly known additive to be added to a resin, such as an antioxidant.

The shape of other inorganic fine particles or resin fine particles may be any of a plate-like, scale-like, acicular, columnar, spherical, polyhedral, or massive shape. Inorganic particles having the above shape may be used singly, or two or more thereof may be used in combination. From the viewpoint of improvement of the permeability, a polyhedron shape constituted with a plurality of faces is preferable.

As for particle size of other inorganic fine particle or resin fine particle, it is preferable that the average secondary particle diameter (D50) thereof is from 0.1 μm to 4.0 μm, more preferable from 0.2 μm to 3.5 μm, and further preferable from 0.4 μm to 3.0 μm. Adjusting the average secondary particle diameter (D50) in such a range, thermal contraction at high temperature tends to be further suppressed.

When another inorganic fine particle or a resin fine particle is added, the fine particle may be added, for example, to (i) a porous layer containing an adsorbent, or (ii) a porous layer other than the porous layer containing an adsorbent, and the nonwoven fabric or microporous membrane constituting a substrate (a porous layer mainly containing an inorganic fine particle other than the first inorganic particle and the second inorganic particle, or a resin fine particle).

When another inorganic fine particle or a resin fine particle is added to (i) a porous layer containing an adsorbent, the content of such other inorganic fine particle or resin fine particle is preferably adjusted such that the content of the adsorbent falls within the above described preferable range.

When another inorganic fine particle or a resin fine particle is added to (ii) a porous layer other than a porous layer containing an adsorbent, and a nonwoven fabric or a microporous membrane constituting a substrate (a porous layer mainly containing another inorganic fine particle, or a resin fine particle), the porous layer containing the fine particle may be placed, for example, in contact with one side of a nonwoven fabric or a microporous membrane to form a substrate (side opposite to a surface in contact with a porous layer mainly containing an adsorbent), placed between the porous layer containing the adsorbent and the substrate, or placed on a porous layer, which contains the adsorbent and is placed on the surface of the substrate, at the side opposite to a surface in contact with the substrate.

A porous layer containing another inorganic fine particle or a resin fine particle as a main component may be integrated with a nonwoven fabric or a woven fabric serving as a substrate, or a porous layer containing an adsorbent, or may be present as an independent membrane that is combined with another layer (independent membrane) in a battery to constitute a separator.

When another inorganic fine particle or a resin fine particle is added to (ii) a porous layer other than a porous layer containing an adsorbent, and a nonwoven fabric or a microporous membrane constituting a substrate (a porous layer mainly containing another inorganic fine particle, or a resin fine particle), the content of the fine particle in the porous layer containing the fine particle is preferably 5 volume-% or more with respect to the total volume of the constituent components (the total volume excluding the pore portion) of such layer, more preferably 10 volume-% or more, and further preferably 50 volume-% or more.

Further, when another inorganic fine particle or a resin fine particle is added to (ii) a porous layer other than a porous layer containing an adsorbent, and a nonwoven fabric or a microporous membrane constituting a substrate (a porous layer mainly containing another inorganic fine particle, or a resin fine particle), it is preferable that the porous layer should also contain a binder. Therefore, the content of the fine particle in the porous layer mainly containing another inorganic fine particle, or a resin fine particle is preferably 99.5 volume-% or less with respect to the total volume of the constituent components (the total volume excluding the pore portion) of such layer. In this case, as a binder, the various binders listed above for the porous layer containing the adsorbent may be used identically.

When a nonaqueous electrolyte battery contains an adsorbent at a location other than a separator, as such a separator, a separator, which uses the nonwoven fabric or the microporous membrane described above as a substrate, and has a porous layer containing mainly another inorganic fine particle or a resin fine particle on one side or both sides thereof, may be used.

The porosity of a separator used for a nonaqueous electrolyte battery is preferably 30% or more in a dried state of the separator in order to secure the holding amount of a nonaqueous electrolyte, and to improve the ion permeability, and more preferably 40% or more. On the other hand, the porosity of the separator is preferably 80% or less in a dry state of the separator from the viewpoint of securing strength of the separator and prevention of internal short circuit, and more preferably 70% or less. The porosity P (%) of a separator may be calculated from the thickness of a separator, the weight per area, and the density of a constituent component by summing up the values of each component i using the following equation.

$$P=[1-(m/t)/(\Sigma a_i \rho_i)] \times 100$$

[wherein, $a_i$ is the ratio of a component i with respect to the total weight as 1; $\rho_i$ is the density (g/cm$^3$) of a component i; m is the weight per unit area of the separator (g/cm$^2$); and t is the thickness (cm) of the separator.]

The thickness of a separator is preferably from 2 μm to 200 μm, more preferably from 5 μm to 100 μm, and further preferably from 7 μm to 30 μm in both the single layer structure and the multilayer structure. When the thickness of the separator is 2 μm or more, the mechanical strength of the separator tends to be enhanced. Further, when the thickness of the separator is 200 μm or less, the volume occupied by the separator in a battery is reduced, so that a nonaqueous electrolyte battery tends to have a higher capacity, and the ion permeability tends to be improved.

The air permeability of a separator is preferably from 10 sec/100 cc to 500 sec/100 cc, more preferably from 20 sec/100 cc to 450 sec/100 cc, and further preferably from 30 sec/100 cc to 450 sec/100 cc. When the air permeability is 10 sec/100 cc or more, there is a tendency that the self-discharge is reduced in using a separator for a nonaqueous electrolyte battery. Further, when the air permeability is 500 sec/100 cc or less, better charge and discharge characteristics tend to be obtained.

When a separator has a porous layer containing an adsorbent and a nonwoven fabric or a microporous membrane as a substrate, the thickness of the porous layer containing an adsorbent is preferably from 1 μm to 10 μm.

Further, when a separator has a porous layer containing an adsorbent and a nonwoven fabric or a microporous membrane as a substrate, or has in addition to these layers, a porous layer containing mainly another inorganic fine particle or a resin fine particle, the thickness of the nonwoven fabric as a substrate or the porous layer is preferably from 5 μm to 40 μm.

Further, when a separator has a porous layer containing mainly another inorganic fine particle or a resin fine particle, the thickness of the porous layer is preferably from 1 μm to 10 μm.

A porous layer containing an adsorbent may be formed through a process in which a composition (such as a paste, or a slurry) is prepared by dispersing or dissolving an adsorbent, a binder, etc., in water or an organic solvent, applied to an area where such a porous layer is to be formed, and then dried; or the composition is applied to a substrate such as a resin film, and dried, and then the coat is peeled to form an independent film.

Further, a porous layer containing mainly another inorganic fine particle or a resin fine particle may also be formed through a process in which a composition (such as a paste, or a slurry) is prepared by dispersing or dissolving the fine particle, binder, etc., in water or an organic solvent, applied to an area where such a porous layer is to be formed, and then dried; or the composition is applied to a substrate such as a resin film, and dried, and then the coat is peeled to form an independent film.

[Positive Electrode]

It is preferable that a positive electrode includes a positive electrode active material, a conductive material, a binder, and a current collector.

As a positive electrode active material which may be contained in the positive electrode, publicly known ones capable of electrochemically absorbing and releasing a lithium ion may be used. Among them, a material containing lithium is preferable as the positive electrode active material. Examples of the positive electrode active material include:

an oxide represented by the following Formula (1):

$$Li_xMn_{2-y}M_yO_z \tag{1}$$

[wherein, M represents at least one element selected from the group consisting of transition metal elements; 0<x≤1.3; 0.2<y<0.8; and 3.5<z<4.5.]

a layered oxide represented by the following Formula (2):

$$Li_xM_yO_z \tag{2}$$

[wherein, M represents at least one element selected from the group consisting of transition metal elements; 0<x≤1.3; 0.8<y<1.2; and 1.8<z<2.2.]

a spinel type oxide represented by the following Formula (3):

$$LiMn_{2-x}Ma_xO_4 \tag{3}$$

[wherein, Ma represents at least one element selected from the group consisting of transition metal elements; and 0.2≤x≤0.7.]

a layered oxide positive electrode active material containing excessive Li represented by the following Formula (6), which is a complex oxide of an oxide represented by the following Formula (4) and an oxide represented by the following Formula (5):

$$Li_2McO_3 \tag{4}$$

[wherein, Mc represents at least one element selected from the group consisting of transition metal elements.]

$$LiMdO_2 \quad (5)$$

[wherein, Md represents at least one element selected from the group consisting of transition metal elements.]

$$zLi_2McO_3\text{-}(1-z)LiMdO_2 \quad (6)$$

[wherein, Mc and Md have respectively the same meanings as Mc and Md in Formulas (4) and (5), and 0.1 z 0.9.]

an olivine type positive electrode active material represented by the following Formula (7):

$$LiMb_{1-y}Fe_yPO_4 \quad (7)$$

[wherein, Mb represents at least one element selected from the group consisting of Mn and Co; and 0≤y≤1.0.], and a compound represented by the following Formula (8):

$$Li_2MePO_4F \quad (8)$$

[wherein, Me represents at least one element selected from the group consisting of transition metal elements.]. These positive electrode active materials may be used singly, or two or more thereof may be used in combination.

Among the above-described positive electrode active materials, those operable at a higher potential to increase the energy density of a battery are preferable. Furthermore, at least one selected from the group consisting of the spinel type lithium manganese composite oxide represented by Formula (3), and the layered compound represented by Formula (2) is preferably used, because the nonaqueous electrolyte battery can effectively trap metal ions which may dissolve out from the positive electrode active material and deposit on the negative electrode to deteriorate the battery characteristics or cause short circuit, so that deterioration of the battery performance may be suppressed.

In order to form a positive electrode, a conductive material, a binder, and a current collector known in the art may be used.

When an adsorbent is added into the positive electrode, a conventionally known method may be used, however not limited thereto. For example, a method of adding an adsorbent into the positive electrode mixture layer, or a method of forming a porous layer containing an adsorbent on the surface of the positive electrode mixture layer may be applied. In the case of the latter method, the porous layer containing the adsorbent may be formed by the same method as in the case of the porous layer containing the adsorbent described above for the multilayer structure separator, and the constitution may be also the same constitution as the porous layer containing the adsorbent pertaining to the multilayer structure separator.

When a positive electrode contains an adsorbent, the content of the adsorbent in the positive electrode is preferably 0.5 volume-% or more with respect to the total volume of the constituent components of the positive electrode excluding the current collector (the total volume excluding the pore portion) from the viewpoint of favorably securing the effect of its use, and more preferably 1 volume-% or more. However, when the content of the adsorbent in the positive electrode is too high, it may apt to constitute a cause of reduction in the energy density of the battery, or increase in internal resistance. Therefore, the content of the adsorbent in the positive electrode is preferably, for example, 10 volume-% or less with respect to the total volume of the constituent components of the positive electrode excluding the current collector (the total volume excluding the pore portion), and more preferably 6 volume-% or less.

Further, in the positive electrode mixture layer with respect to the positive electrode, when the positive electrode mixture layer does not contain an adsorbent, it is preferable that the content of the positive electrode active material is adjusted to from 87 weight-% to 97 weight-%, and the content of the conductive assistant is adjusted to from 1.5 weight-% to 6.5 weight-%, and/or the content of the binder is adjusted to from 1.5 weight-% to 6.5 weight-%.

On the other hand, when the positive electrode mixture layer contains an adsorbent, it is preferable that the content of the positive electrode active material is adjusted to from 79.4 weight-% to 96.4 weight-% with respect to the total amount of components other than the adsorbent in the positive electrode mixture layer as 100 weight-%, the content of the conductive assistant is adjusted to from 1.4 weight-% to 6.5 weight-%, and/or the content of the binder is adjusted to from 1.4 weight-% to 6.5 weight-%.

[Negative Electrode]

It is preferable that the negative electrode includes a negative electrode active material, a binder, and a current collector.

As a negative electrode active material to be contained in a negative electrode, a publicly known one capable of electrochemically absorbing and releasing lithium ions may be used. There is no particular restriction on such negative electrode active material, and, for example, a carbon material, such as a graphite powder, a mesophase carbon fiber, and a mesophase microsphere, a metal, an alloy, an oxide, and a nitride are preferable. These may be used singly, or two or more thereof may be used in combination.

As a binder to be contained in a negative electrode, a publicly known binder capable of binding at least two of a negative electrode active material, a conductive material to be contained in a negative electrode, and a current collector to be contained in a negative electrode, may be used. Although there is no particular restriction on such a binder, preferable examples thereof may include carboxymethylcellulose, a crosslinked rubber latex of styrene/butadiene, an acrylic latex, and poly(vinylidene fluoride). These may be used singly, or two or more thereof may be used in combination.

Although there is no particular restriction on a current collector to be included in a negative electrode, examples thereof may include a metal foil, such as copper, nickel, and stainless steel; an expanded metal; a punched metal; a foamed metal; a carbon cloth; and a carbon paper. These may be used singly, or two or more thereof may be used in combination.

For adding an adsorbent into a negative electrode, a conventionally known method may be used without particular limitation. There are, for example, a method of adding an adsorbent in a negative electrode mixture layer, or a method of forming a porous layer containing an adsorbent on the surface of a negative electrode (the surface of a negative electrode mixture layer, or a negative electrode material layer). In the case of the latter method, the porous layer containing the adsorbent may be formed by the same method as in the case of the porous layer containing an adsorbent described above for the multilayer structure separator, and the constitution may be also the same constitution as the porous layer containing the adsorbent pertaining to the multilayer structure separator.

When a negative electrode contains an adsorbent, the content of the adsorbent in the negative electrode is preferably 1.5 volume-% or more with respect to the total volume of the constituent components of the negative electrode excluding the current collector (the total volume excluding the pore portion) from the viewpoint of favorably securing the effect of its use, and more preferably 2 volume-% or more. However, when the quantity of the adsorbent in the negative electrode is too high, it may apt to constitute a cause of reduction in the energy density of the battery, or increase in internal resistance. Therefore, the content of the adsorbent in the negative electrode is preferably 25 volume-% or less with respect to the total volume of the constituent components of the negative electrode excluding the current collector (the total volume excluding the pore portion), and more preferably 15 volume-% or less.

Further, in the negative electrode mixture layer with respect to the negative electrode, when the negative electrode mixture layer does not contain an adsorbent, it is preferable that the content of the negative electrode active material is adjusted to from 88 weight-% to 99 weight-%, and/or the content of the binder is adjusted to from 1 weight-% to 12 weight-%. When a conductive assistant is used, the content of the conductive assistant is preferably adjusted to from 0.5 weight-% to 6 weight-%.

On the other hand, when the negative electrode mixture layer contains an adsorbent, it is preferable that the content of the negative electrode active material is adjusted to from 68 weight-% to 98 weight-% with respect to the total amount of components other than the adsorbent in the negative electrode mixture layer as 100 weight-%, and/or the content of the binder is adjusted to from 0.8 weight-% to 11.8 weight-%. When a conductive assistant is used, the content of the conductive assistant is preferably adjusted to from 0.9 weight-% to 5.9 weight-%.

[Nonaqueous Electrolyte]

As a nonaqueous electrolyte, for example, a solution (nonaqueous electrolytic solution) obtained by dissolving a lithium salt in an organic solvent is used. There is no particular restriction on the lithium salt, and a conventionally known lithium salt may be used. Although there is no particular restriction on the lithium salt, examples thereof include $LiPF_6$ (lithium hexafluorophosphate), $LiClO_4$, $LiBF_4$, $LiAsF_6$, $Li_2SiF_6$, $LiOSO_2CkF_{2k+1}$ (wherein k is an integer of 1 to 8), $LiN(SO_2C_2F_{2k+1})_2$ (wherein k is an integer of 1 to 8), $LiPF_n(CkF_{2k+1})_{6-n}$ (wherein n is an integer of 1 to 5, and k is an integer of 1 to 8), $LiPF_4(C_2O_4)$, and $LiPF_2(C_2O_4)_2$. Among these, $LiPF_6$ is preferable. By using $LiPF_6$, the battery characteristics and safety tend to be superior even at a high temperature. These lithium salts may be used singly, or two or more thereof may be used in combination.

There is no particular restriction on a nonaqueous solvent used for the nonaqueous electrolyte, and a conventionally known solvent may be used. For example, an aprotic polar solvent is preferable as such a nonaqueous solvent, however not limited thereto.

Examples of the aprotic polar solvent include, without particular limitation thereto, a cyclic carbonate, such as ethylene carbonate, propylene carbonate, 1,2-butylene carbonate, 2,3-butylene carbonate, 1,2-pentylene carbonate, 2,3-pentylene carbonate, trifluoromethylethylene carbonate, fluoroethylene carbonate, and 4,5-difluoroethylene carbonate; a lactone, such as γ-butyrolactone, and γ-valerolactone; a cyclic sulfone, such as sulfolane; a cyclic ether, such as tetrahydrofuran, and dioxane; a linear carbonate, such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, and methyl trifluoroethyl carbonate; a nitrile, such as acetonitrile; a linear ether, such as dimethyl ether; a linear carboxylic acid ester, such as methyl propionate; and a linear ether carbonate compound, such as dimethoxyethane. These may be used singly, or two or more thereof may be used in combination.

The concentration of a lithium salt in a nonaqueous electrolyte is preferably from 0.5 mol/L to 1.5 mol/L, and more preferably from 0.9 mol/L to 1.25 mol/L.

In this regard, the nonaqueous electrolyte may be a liquid electrolyte, or a solid electrolyte.

When an adsorbent is added into a nonaqueous electrolyte, the content of the adsorbent in the nonaqueous electrolyte is preferably 5 mg or more per 1 mL of the nonaqueous electrolyte from the viewpoint of favorably securing the effect of its use, and more preferably 10 mg or more.

[Paint and Resin Solid for Nonaqueous Electrolyte Battery]

A paint or a resin solid, which is used for a nonaqueous electrolyte battery, and contains the adsorbent described above, is also an aspect of the present invention.

The paint may be a liquid paint containing in addition to an adsorbent of a substance which affects the life characteristics or safety of a battery, additional components, such as a resin, a dispersant, water, and an organic solvent, or a powder paint containing in addition to an adsorbent a film forming component such as a resin. As the resin contained in the paint the various resins described above in connection with the constituent elements of a nonaqueous electrolyte battery may be used. The paint may be formed by a heretofore known method, such as mixing, stirring, and dispersing.

The resin solid contains at least one kind of resin in addition to an adsorbent of a substance which affects the life characteristics or safety of a battery. As the resin contained in the resin solid, the various resins described above in connection with the constituent elements of a nonaqueous electrolyte battery may be used. The resin solid may be formed by a known method such as kneading, mixing, extruding, and molding.

[Additional Constitution, Shape and Use of Nonaqueous Electrolyte Battery]

A nonaqueous electrolyte battery is preferably provided with an adsorptive layer containing a nonaqueous electrolyte battery inorganic particle, or an adsorptive layer containing a mixture of the nonaqueous electrolyte battery inorganic particle (the first inorganic particle) and the second inorganic particle, inside, or over all or one of the surfaces of battery constituent materials.

From the relationship between the arrangement of an adsorptive layer and the adsorption capacity for a metal or HF, a nonaqueous electrolyte battery preferably includes a positive electrode, a negative electrode, and a separator as the battery constituent materials. From the same viewpoint, the adsorptive layer is preferably formed at least any of inside the separator, on the facing surfaces of the positive electrode and the separator, and the facing surfaces of the negative electrode and the separator, and the formed adsorptive layer is preferably formed in the entire or part of the inner part of the separator, or on the entire or part of the respective facing surfaces.

From the viewpoint of life characteristics and safety, the retention rate of the discharge capacity after repetition of 40 cycles of charge and discharge of a nonaqueous electrolyte battery at a voltage of from 3.0 V to 4.35 V and a temperature of 50° C. or higher is preferably 90% or more, and it is more preferable that the retention rate of the discharge capacity after repetition of 60 cycles of the charge and discharge is 75% or more, or the retention rate of the discharge capacity after repetition of 100 cycles of the charge and discharge is 60% or more.

In a nonaqueous electrolyte battery, a positive electrode and a negative electrode may be used in the form of a laminate stacked through the intermediary of a separator, or in the form of an electrode roll prepared by further winding up the laminate.

The form of a nonaqueous electrolyte battery may include a cylindrical form (e.g. square cylinder, round cylinder) using a steel can, an aluminum can, etc., as an exterior can. Alternatively, a nonaqueous electrolyte battery may be formed using a laminated film with a deposited metal as the outer package.

In a case where a nonaqueous electrolyte battery is a lithium ion secondary battery, it is preferable that a lithium ion secondary battery should include a laminate in which a positive electrode, an adsorptive layer containing the inorganic particle for a nonaqueous electrolyte battery described above, a separator, and a negative electrode layered one on another in the mentioned order, or a roll wound up therewith, and a nonaqueous electrolyte. When a plurality of constituent elements of a lithium ion secondary battery are arranged in such an order, movement of lithium ions in the battery is secured, and adsorption of a substance which affects the life characteristics or safety of a battery is remarkable. An adsorptive layer containing an inorganic particle may be formed using the paint for a nonaqueous electrolyte battery and the resin solid described above, or formed as a part of the multilayer structure separator described above.

EXAMPLES

The present invention will be described below in more detail by way of Examples, provided that the present invention be not limited to the Examples. In addition, various measurements and evaluations were carried out under conditions of room temperature 23° C., 1 atm, and relative humidity 50% unless otherwise specified.

Example 1

<Preparation of Calcium Silicate Hydrate>

Silicon dioxide, and calcium oxide were dispersed in water to form a slurry, and then maturation was carried out in an autoclave at 180° C. in saturated steam for 40 hours. In this case, the C/S ratio was 0.83, and the weight ratio of water to the total solid content composed of silicon dioxide and calcium oxide was 2.0. The matured sample was pulverized with a ball mill, and dried to obtain a layered calcium silicate hydrate A. The BET specific surface area of the obtained calcium silicate hydrate A was 45 m²/g. The average particle diameter of the obtained calcium silicate hydrate A was 100 nm.

<Average Particle Diameter>

After fabrication of the separator described below, the cross section of the separator was observed with a scanning electron microscope (SEM), to measure respectively the thicknesses of 20 particles of the calcium silicate hydrate A. By dividing the total of the measured thicknesses by 20, an average thickness (100 nm) was obtained as the average particle diameter of the calcium silicate hydrate A. Also, it was confirmed that the average thickness obtained by an SEM observation of a mere dry powder of the calcium silicate hydrate A was approximately equal to the average thickness of the calcium silicate hydrate A obtained by an SEM observation of the cross section of the separator.

In Examples 2 to 15 and Comparative Examples 1 to 5, the average particle diameters were measured in the same manner as in Example 1 except that inorganic particles were changed as set forth in Table 1.

The average particle diameter of an inorganic particle itself obtained by an SEM observation is different from the average secondary particle diameter (D50) obtained by a particle size distribution measurement of the dispersion described below.

<X-Ray Diffraction Measurement>

With regard to the obtained calcium silicate hydrate A, a powder X-ray diffraction measurement was carried out using an X-ray diffractometer (D2 PHASER, manufactured by Bruker Corporation) using Cu-Kα ray, under the conditions of accelerating voltage of 30 kV, tube current of 10 mA, divergence slit of 1 mm, Soller slit of 4°, air scatter screen of 1 mm, Kβ filter of 0.5 mm, counting time of 0.15 sec, 0.02° step, and measurement range of 5° to 40°. A standard silicon powder was used for correction of the X-ray diffractometer. The obtained diffraction pattern is presented in FIG. 1. From the diffraction pattern, a diffraction peak derived from the (002) plane was seen in the vicinity of 8° (2θ) and a diffraction peak derived from the (220) plane was observed in the vicinity of 29° (2θ), which was identified as the structure of a layered tobermorite. The average interplanar spacing of the (002) plane was 1.1 nm.

<Preparation of Separator>

A polyolefin resin mixture was obtained by dry-blending 47.5 parts by weight of a polyethylene homopolymer with Mv 700,000; 47.5 parts by weight of a polyethylene homopolymer with Mv 250,000; and 5 parts by weight of a polypropylene homopolymer with Mv 400,000 using a tumbler blender. Further, 1 weight-% of pentaerythrityl-tetrakis[3-(3,5-di-t-butyl-4-hydroxyphenyl) propionate] was added as an antioxidant to 99 weight-% of the obtained polyolefin resin mixture and the two were dry-blended gain using a tumbler blender to obtain a polyolefin resin composition.

After purging with nitrogen, the obtained polyolefin resin composition was fed to a twin-screw extruder with a feeder in a nitrogen atmosphere. A liquid paraffin (kinematic viscosity at 37.78° C.: 7.59×10⁻⁵ m²/s) was injected into the extruder cylinder by a plunger pump. The feeder and the pump were adjusted such that the liquid paraffin content in the entire mixture melt-kneaded and extruded by the twin-screw extruder was 66 weight-% (the resin composition concentration was 34%). The melt kneading conditions were: set temperature of 200° C., screw rotation speed of 100 rpm, and discharge rate of 12 kg/h.

Subsequently, the melt-kneaded product was extruded through a T-die and cast on a cooling roll regulated at a surface temperature of 25° C. to obtain a gel sheet with a thickness of 1,600 μm. Next, the obtained gel sheet was guided to a simultaneous biaxial tenter stretching machine and stretched biaxially. The set stretching conditions were: MD draw ratio of 7.0, TD draw ratio of 6.1, and set temperature of 123° C. Next, the gel sheet after biaxial stretching was guided to an ethyl methyl ketone tank, sufficiently immersed in ethyl methyl ketone to extract and remove liquid paraffin, and then ethyl methyl ketone was removed by drying. Finally, the dried gel sheet was guided to a TD tenter, and stretched and thermally relaxed to obtain a polyolefin microporous membrane. The stretching temperature was 125° C., the thermal relaxation temperature was 133° C., the TD maximum draw ratio was 1.65, and the relaxation rate was 0.9. The obtained polyolefin microporous membrane had a thickness of 12 μm and a porosity of 40%.

29 parts by weight of the calcium silicate A as a layered calcium silicate hydrate and 0.29 parts by weight of a polycarboxylate ammonium aqueous solution (SN Dispersant 5468, manufactured by San Nopco Limited) were mixed in 100 parts by weight of ion exchanged water. After mixing, a bead mill treatment was carried out to adjust the average particle diameter (D50) to 1.5 μm to obtain a dispersion. Further, to 100 parts by weight of the obtained dispersion, 2.2 parts by weight of an acrylic latex suspension (solid content concentration of 40%, and average particle diameter of 150 nm) was added as a binder, and the two were mixed to prepare a uniform composition for a porous layer. In this regard, the average particle diameter of the layered calcium silicate hydrate in the above dispersion was determined by measuring the particle size distribution using a laser particle size distribution analyzer (Microtrac MT 3300 EX, manufactured by Nikkiso Co., Ltd.), and calculating a particle diameter at which the volume cumulative frequency is 50% as the average secondary particle diameter (μm). The average particle size of the resin latex binder was determined by measuring a volume average particle diameter (nm) as the average particle diameter using a particle diameter measuring device (MICROTRACTMUPA 150 manufactured by Leed & Northrup Co.) based on a light scattering method.

Next, the composition for forming a porous layer was coated on the surface of the polyolefin microporous membrane using a micro gravure coater, dried at 60° C. to remove water, and a 5 μm-thick porous layer containing a layered calcium silicate hydrate was placed on the polyolefin microporous membrane to obtain a multilayer structure separator containing the calcium silicate hydrate A. The volume ratio of the calcium silicate hydrate A in the porous layer containing the layered calcium silicate hydrate A in the separator was 97 volume-%.

<Production of Positive Electrode>

$LiNi_{0.5}Co_{0.2}Mn_{0.3}O_2$ as the positive electrode active material, an acetylene black powder as the conductive assistant, and a poly(vinylidene fluoride) solution as the binder were mixed at a solid content ratio of 93.9/3.3/2.8 by weight ratio. To the obtained mixture, N-methyl-2-pyrrolidone was added as a dispersion solvent to a solid content of 35 weight-%, and the mixture was further mixed to prepare a slurry-like solution. The slurry-like solution was coated on both sides of a 10 μm thick aluminum foil. In doing so, a part of the aluminum foil was exposed. Thereafter, the solvent was removed by drying and rolling was carried out with a roll press. The sample after rolling was trimmed such that the size of the coated part was 30 mm×50 mm, and the exposed part of the aluminum foil was included, and an aluminum lead piece for taking out current was welded to the exposed part of the aluminum foil thereby obtaining a positive electrode.

<Preparation of Negative Electrode>

A graphite powder as the negative electrode active material, and a styrene butadiene rubber and a carboxymethyl-cellulose aqueous solution as the binder were mixed at a weight ratio of solid contents of 97.5/1.5/1.0. The obtained mixture was added to water as a dispersion solvent such that the solid content concentration was 45 weight-% to prepare a slurry-like solution. The slurry-like solution was coated on one side or both sides of a 10 μm-thick copper foil. In doing so, a part of the aluminum foil was exposed. Thereafter, the solvent was removed by drying and rolled with a roll press. The sample after rolling was trimmed such that the size of the coated part was 32 mm×52 mm, and the exposed part of the copper foil was included, and a nickel lead piece for taking out current was welded to the exposed part of the copper foil thereby obtaining a negative electrode.

<Preparation of Nonaqueous Electrolyte>

$LiPF_6$ was dissolved at 1 mol/L in a mixed solvent in which ethylene carbonate (EC) and ethyl methyl carbonate (EMC) were mixed at a volume ratio of 1/2 in an argon gas atmosphere, to obtain a nonaqueous electrolyte (nonaqueous electrolytic solution).

<Preparation of Nonaqueous Electrolyte Battery>

The positive electrode and the negative electrode were combined through the intermediary of the separator to form a laminated electrode body. The separator was disposed such that a porous layer containing a layered calcium silicate hydrate faced the positive electrode. The laminated electrode body was inserted into an aluminum laminate outer package of 80×60 cm. Next, the nonaqueous electrolyte (nonaqueous electrolytic solution) was injected into the outer package, and then the opening of the outer package was closed to complete a nonaqueous electrolyte battery (lithium ion secondary battery) having internally a laminated electrode body. The rated capacity of the obtained nonaqueous electrolyte battery was 90 mAh.

<Measurement of Metal Adsorption Capacity>

Manganese trifluoromethanesulfonate [$Mn(CF_3SO_3)_2$] was dissolved in the nonaqueous electrolyte used for a nonaqueous electrolyte battery in an argon gas atmosphere, such that the concentration of Mn was 5 ppm. In an atmosphere of argon gas, 100 parts by weight of the nonaqueous electrolyte having dissolved Mn, and 0.035 parts by weight of the calcium silicate hydrate A were placed in a hermetically closed container made of polypropylene, which was shaken in an atmosphere at 23° C. using a variable mix rotor VMR-5R (manufactured by AS ONE Corporation) at 100 rpm for 6 hours. Thereafter, filtration was carried out with a membrane filter made of PTFE having a pore size of 0.2 μm. The concentration (unit: ppm) of Mn in the filtrate (Mx) was measured, and the adsorption rate (Ax) (unit: %) was calculated according to the following equation.

$$Ax=[(5-Mx)/5]\times 100$$

The concentration of Mn was measured by ICP emission spectroscopic analysis (ICP emission spectroscopic analyzer: Optima 8300, manufactured by Perkin Elmer PerkinElmer, Inc.). For a pretreatment of the measurement sample, acid decomposition (microwave method) was carried out.

<Evaluation of HF Adsorption Capacity>

Distilled water was added to the nonaqueous electrolyte used for the nonaqueous electrolyte battery in an argon gas atmosphere and stored at 23° C. for 2 weeks to prepare a nonaqueous electrolyte containing 800 ppm of HF. Then 100 parts by weight of the nonaqueous electrolyte, and 8 parts by weight of the calcium silicate hydrate A were placed in a hermetically closed container made of polypropylene, which was shaken in an atmosphere at 23° C. for 5 min. Thereafter, filtration was carried out with a membrane filter made of PTFE having a pore size of 0.2 μm. The fluoride ion concentration in the filtrate was quantified by ion chromatographic analysis and the HF concentration was calculated. When the HF concentration was less than 10 ppm, the HF adsorptive capacity was rated as "good". When it was 10 ppm or more, HF adsorptive capacity was rated as "poor".

<Evaluation of Life Characteristics>
Initial Charge and Discharge

The obtained nonaqueous electrolyte secondary battery (hereinafter, also simply referred to as "battery") was placed in a thermostatic chamber (thermostatic chamber PLM-73S, manufactured by Futaba Co., Ltd.) set at 25° C., and connected to a charge/discharge apparatus (charge/discharge apparatus ACD-01, manufactured by Aska Electronic Co., Ltd.). Next, the battery was charged with a constant current of 0.05 C, until the voltage reached 4.35 V, then charged with a constant voltage of 4.35 V for 2 hours, and discharged to 3.0 V with a constant current of 0.2 C. In this regard, 1 C is a current value at which the battery is discharged in 1 hour.

Cycle Test

The battery after the initial charge was placed in a thermostatic chamber (thermostatic chamber PLM-73S, manufactured by Futaba Science Futaba Co., Ltd.,) set at 50° C., and connected with a charging/discharging device (Charging/discharging Device ACD-01, manufactured by Aska Electronic Co., Ltd.). Next, the battery was charged at a constant current of 1 C, until the voltage reached 4.35 V, thereafter charged with a constant voltage of 4.35 V for 1 hour, and discharged to 3.0 V with a constant current of 1 C. This series of charging and discharging was regarded as one cycle, and another 99 cycles of charging and discharging was repeated. In doing so, the retention rate of the discharge capacity and the presence or absence of micro short circuit were evaluated.

The retention rate of the discharge capacity (unit: %) was calculated from the discharge capacity at the first cycle and the discharge capacities at the 40th, 60th, or 100th cycle according to the following equation.

Retention rate of discharge capacity=(Discharge capacity at 40th, 60th, or 100th cycle/Discharge capacity at 1st cycle)×100

Regarding the presence or absence of a micro short circuit, a case, in which the charge capacity was at least 2 times as high as the rated capacity at any of the 1st cycle to the 100th cycle, was rated that a micro short circuit "occurred", and a case, in which it was less than 2 times, was rated that a micro short circuit "not occurred".

Example 2

Silicon dioxide, calcium oxide, γ-alumina, and sodium hydroxide were dispersed in water at a weight ratio of 39.5/43.3/6.5/10.7 to form a slurry, and then maturation was carried out in an autoclave at 190° C. in saturated steam for 20 hours. In this case, the C/S ratio was 0.98, and the weight ratio of water to the total solid content composed of silicon dioxide and calcium oxide was 2.0. The matured sample was pulverized with a ball mill, and dried to obtain a layered calcium silicate hydrate B. The BET specific surface area of the obtained calcium silicate hydrate B was 68 m$^2$/g. The average particle diameter of the obtained calcium silicate hydrate B was 300 nm. Further, an X-ray diffraction measurement was carried out in the same manner as in Example 1. The obtained diffraction pattern is presented in FIG. 1. From the diffraction pattern, a diffraction peak derived from the (002) plane was seen in the vicinity of 8° (2θ), and a diffraction peak derived from the (220) plane was observed in the vicinity of 29° (2θ), which was identified as the structure of a layered tobermorite. The average interplanar spacing of the (002) plane was 1.1 nm.

Using a calcium silicate hydrate B, a multilayer structure separator containing the calcium silicate hydrate B was obtained in the same manner as in Example 1. In the separator, the volume ratio of the calcium silicate hydrate B in the porous layer containing the layered calcium silicate hydrate was 97 volume-%. Further, a measurement of metal adsorption capacity, an evaluation of HF adsorption capacity, and an evaluation of life characteristics were carried out in the same manner as in Example 1.

Example 3

Silicon dioxide, and calcium oxide were dispersed in water to form a slurry, and then maturation was carried out at 80° C. for 72 hours. In this case, the C/S ratio was 0.6, and the weight ratio of water to the total solid content composed of silicon dioxide and calcium oxide was 4.0. The matured sample was pulverized with a ball mill, and dried to obtain a layered calcium silicate hydrate C. The BET specific surface area of the obtained calcium silicate hydrate C was 290 m$^2$/g. The average particle diameter of the obtained calcium silicate hydrate C was 30 nm. Further, an X-ray diffraction measurement was carried out in the same manner as in Example 1. The obtained diffraction pattern is presented in FIG. 1. From the diffraction pattern, a broad diffraction peak was seen in the vicinity of 29° (2θ), which was identified as the structure of a layered CSH. The average interplanar spacing of the (002) plane was 1.1 nm.

Using a calcium silicate hydrate C, a multilayer structure separator containing the calcium silicate hydrate C was obtained in the same manner as in Example 1. In the separator, the volume ratio of the calcium silicate hydrate C in the porous layer containing the layered calcium silicate hydrate was 97 volume-%.

Further, a measurement of metal adsorption capacity, an evaluation of HF adsorption capacity, and an evaluation of life characteristics were carried out in the same manner as in Example 1.

Example 4

Silicon dioxide, and calcium oxide were dispersed in water to form a slurry, and then maturation was carried out at 80° C. for 72 hours. In this case, the C/S ratio was 1.2, and the weight ratio of water to the total solid content composed of silicon dioxide and calcium oxide was 4.0. The matured sample was pulverized using a ball mill, and dried to obtain a layered calcium silicate hydrate D. The BET specific surface area of the obtained calcium silicate hydrate D was 150 m$^2$/g. The average particle diameter of the obtained calcium silicate hydrate D was 40 nm. Further, an X-ray diffraction measurement was carried out in the same manner as in Example 1. The obtained diffraction pattern is presented in FIG. 1. From the diffraction pattern, a broad diffraction peak was seen in the vicinity of 29° (2θ), which was identified as the structure of a layered CSH. The average interplanar spacing of the (002) plane was 1.1 nm.

Using a calcium silicate hydrate D, a multilayer structure separator containing the calcium silicate hydrate D was obtained in the same manner as in Example 1. In the separator, the volume ratio of the calcium silicate hydrate D in the porous layer containing the layered calcium silicate hydrate was 97 volume-%.

Further, a measurement of metal adsorption capacity, an evaluation of HF adsorption capacity, and an evaluation of life characteristics were carried out in the same manner as in Example 1.

Example 5

Zirconium oxychloride octahydrate containing 2% of hafnium was dissolved in water, and then oxalic acid dihydrate was dissolved. In doing so, the molar ratio of zirconium oxychloride octahydrate containing 2% of hafnium to oxalic acid dihydrate was 1/2.9, and the weight ratio of water to these was 4.5. The solution was stirred to which phosphoric acid was added, and then it was refluxed with stirring for 8 hours. In doing so, phosphoric acid was added such that the molar ratio of zirconium oxychloride octahydrate containing 2% of hafnium to phosphoric acid was 1/2.1. After cooling, the obtained precipitate was washed with water and then dried to obtain zirconium phosphate A. The BET specific surface area of the obtained zirconium phosphate A was 4 $m^2/g$. The average particle diameter of the obtained zirconium phosphate A was 300 nm. Further, an X-ray diffraction measurement was carried out in the same manner as in Example 1. The obtained diffraction pattern is presented in FIG. 1. From the diffraction pattern, a diffraction peak derived from the (002) plane was seen in the vicinity of 13° (2θ), which was identified as the structure of a layered zirconium phosphate. The average interplanar spacing of the (002) plane was 0.7 nm.

Using a zirconium phosphate A, a multilayer structure separator containing zirconium phosphate was obtained in the same manner as in Example 1. In the separator, the volume ratio of the zirconium phosphate A in the porous layer containing the layered zirconium phosphate A was 97 volume-%.

Further, a measurement of metal adsorption capacity, an evaluation of HF adsorption capacity, and an evaluation of life characteristics were carried out in the same manner as in Example 1.

Example 6

Zirconium oxychloride octahydrate containing 2% of hafnium was dissolved in water, and then oxalic acid dihydrate was dissolved. In doing so, the molar ratio of zirconium oxychloride octahydrate containing 2% of hafnium to oxalic acid dihydrate was 1/2.9, and the weight ratio of water to these was 4.5. The solution was stirred to which phosphoric acid was added, and then it was refluxed with stirring for 8 hours. In doing so, phosphoric acid was added such that the molar ratio of zirconium oxychloride octahydrate containing 2% of hafnium to phosphoric acid was 1/2.1. After cooling, the obtained precipitate was washed with water, then immersed in a 0.1 N LiOH aqueous solution for 8 hours, and then dried to obtain zirconium phosphate B. The BET specific surface area of the obtained zirconium phosphate B was 4 $m^2/g$. The average particle diameter of the obtained zirconium phosphate B was 290 nm. Further, an X-ray diffraction measurement was carried out in the same manner as in Example 1. From the diffraction pattern, a diffraction peak derived from the (002) plane was seen in the vicinity of 13° (2θ), which was identified as the structure of a layered zirconium phosphate. The average interplanar spacing of the (002) plane was 0.7 nm.

Using the zirconium phosphate B, a multilayer structure separator containing the zirconium phosphate was obtained in the same manner as in Example 1. In the separator, the volume ratio of the zirconium phosphate B in the porous layer containing the layered zirconium phosphate was 97 volume-%.

Further, a measurement of metal adsorption capacity, an evaluation of HF adsorption capacity, and an evaluation of life characteristics were carried out in the same manner as in Example 1.

Example 7

The calcium silicate hydrate A synthesized in Example 1 and alumina as the second inorganic particle were mixed at a weight ratio of 1/1 to prepare a mixed inorganic filler A. The average particle diameter of the calcium silicate hydrate A was 100 nm, and the average particle diameter of the alumina was 1150 nm. Using the mixed inorganic filler A, a multilayer structure separator containing the mixed inorganic filler A was obtained in the same manner as in Example 1. In the separator, the volume ratio of the calcium silicate hydrate A in the porous layer containing the layered calcium silicate hydrate was 46 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate A and the second inorganic particle were used after premixing.

Example 8

The calcium silicate hydrate A synthesized in Example 1 and barium sulfate as the second inorganic particle were mixed at a weight ratio of 1/1 to prepare a mixed inorganic filler B. The average particle diameter of the calcium silicate hydrate A was 100 nm, and the average particle diameter of barium sulfate was 1550 nm. Using the mixed inorganic filler B, a multilayer structure separator containing the mixed inorganic filler B was obtained in the same manner as in Example 1. In the separator, the volume ratio of the calcium silicate hydrate A in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate A and the second inorganic particle were used after premixing.

Example 9

The calcium silicate hydrate A synthesized in Example 1 and boehmite as the second inorganic particle were mixed at a weight ratio of 1/1 to prepare a mixed inorganic filler C. The average particle diameter of the calcium silicate hydrate A was 100 nm, and the average particle diameter of boehmite was 650 nm. Using the mixed inorganic filler C, a multilayer structure separator containing the mixed inorganic filler C was obtained in the same manner as in Example 1. In the separator, the volume ratio of the calcium silicate hydrate A in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate A and the second inorganic particle were used after premixing.

Example 10

The calcium silicate hydrate B synthesized in Example 2 and boehmite as the second inorganic particle were mixed at a weight ratio of 1/1 to prepare a mixed inorganic filler D. The average particle diameter of the calcium silicate hydrate B was 300 nm, and the average particle diameter of boehmite was 650 nm. Using the mixed inorganic filler D, a multilayer structure separator containing the mixed inorganic filler D was obtained in the same manner as in Example 1. In the separator, the volume ratio of the calcium silicate hydrate B in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate B and the second inorganic particle were used after premixing.

Example 11

The calcium silicate hydrate C synthesized in Example 3 and boehmite as the second inorganic particle were mixed at a weight ratio of 1/1 to prepare a mixed inorganic filler E. The average particle diameter of the calcium silicate hydrate C was 30 nm, and the average particle diameter of boehmite was 650 nm. Using the mixed inorganic filler E, a multilayer structure separator containing the mixed inorganic filler E was obtained in the same manner as in Example 1. In the separator, the volume ratio of the calcium silicate hydrate C in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate C and the second inorganic particle were used after premixing.

Examples 12

The calcium silicate hydrate D synthesized in Example 4 and boehmite as the second inorganic particle were mixed at a weight ratio of 1/1 to prepare a mixed inorganic filler F. The average particle diameter of the calcium silicate hydrate D was 40 nm, and the average particle diameter of boehmite was 650 nm. Using the mixed inorganic filler F, a multilayer structure separator containing the mixed inorganic filler F was obtained in the same manner as in Example 1. In the separator, the volume ratio of the calcium silicate hydrate D in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate D and the second inorganic particle were used after premixing.

Example 13

The zirconium phosphate A synthesized in Example 5 and boehmite as the second inorganic particle were mixed at a weight ratio of 1/1 to prepare a mixed inorganic filler G. The average particle diameter of the zirconium phosphate A was 300 nm, and the average particle diameter of boehmite was 650 nm. Using the mixed inorganic filler G, a multilayer structure separator containing the mixed inorganic filler G was obtained in the same manner as in Example 1. In the separator, the volume ratio of the zirconium phosphate A in the porous layer containing the layered zirconium phosphate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the zirconium phosphate A and the second inorganic particle were used after premixing.

Example 14

The zirconium phosphate B synthesized in Example 6 and boehmite as the second inorganic particle were mixed at a weight ratio of 1/1 to prepare a mixed inorganic filler H. The average particle diameter of zirconium phosphate B was 290 nm, and the average particle diameter of boehmite was 650 nm. Using the mixed inorganic filler H, a multilayer structure separator containing the mixed inorganic filler H was obtained in the same manner as in Example 1. In the separator, the volume ratio of the zirconium phosphate B in the porous layer containing the layered zirconium phosphate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the zirconium phosphate B and the second inorganic particle were used after premixing.

Example 15

The calcium silicate hydrate A synthesized in Example 1 and calcium silicate (wollastonite) as the second inorganic particle were mixed at a weight ratio of 1/1 to prepare a mixed inorganic filler I. The average particle diameter of the calcium silicate hydrate A was 100 nm, and the average particle diameter of the calcium silicate was 850 nm. Using the mixed inorganic filler I, a multilayer structure separator containing the mixed inorganic filler I was obtained in the same manner as in Example 1. In the separator, the volume ratio of the calcium silicate hydrate A in the porous layer containing the layered calcium silicate hydrate was 48 volume-%. Further, a measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the calcium silicate hydrate A and the second inorganic particle were used after premixing.

Comparative Example 1

A multilayer structure separator containing zeolite was obtained in the same manner as in Example 1 except that zeolite (specific surface area: 550 $m^2/g$) was used in place of calcium silicate hydrate. In the separator, the volume ratio of zeolite in the porous layer containing zeolite was 97 volume-%.

A measurement of metal adsorption capacity, an evaluation of HF adsorption capacity, and an evaluation of life characteristics were carried out in the same manner as in Example 1.

Comparative Example 2

A multilayer structure separator containing aluminum silicate was obtained in the same manner as in Example 1 except that aluminum silicate ($Al_2O_3 \cdot 2SiO_2$) was used in place of calcium silicate hydrate. In the separator, the volume ratio of aluminum silicate in the porous layer containing aluminum silicate was 97 volume-%.

A measurement of metal adsorption capacity, an evaluation of HF adsorption capacity, and an evaluation of life characteristics were carried out in the same manner as in Example 1.

Comparative Example 3

A multilayer structure separator containing boehmite was obtained in the same manner as in Example 1 except that boehmite (AlOOH) was used in place of calcium silicate hydrate. In the separator, the volume ratio of aluminum silicate in the porous layer containing boehmite was 97 volume-%.

A measurement of metal adsorption capacity, an evaluation of HF adsorption capacity, and an evaluation of life characteristics were carried out in the same manner as in Example 1.

Comparative Example 4

Lithium nickel cobalt manganese oxide ($LiNi_{1/3}Co_{1/3}Mn_{1/3}O_4$) and a poly(vinylidene fluoride) solution as a binder were mixed at a weight ratio of 96.9/3.1 in terms of solid content. To the obtained mixture, N-methyl-2-pyrrolidone was added as a dispersion solvent diluting to a solid content of 35 weight-%, and further mixed to prepare a slurry-like solution. The slurry-like solution was layered on a polyolefin microporous membrane to have a thickness of 5 μm. For the average particle diameter of $LiMn_2O_4$ in the above dispersion, a particle size distribution was measured using a laser particle size distribution analyzer (Microtrac MT 3300 EX, manufactured by Nikkiso Co., Ltd.), and the particle diameter at which the volume cumulative frequency was 50% was taken as the average particle diameter (μm). In addition, for the average particle size of the resin latex binder, a volume average particle diameter (nm) was measured using a particle diameter measuring device based on a light scattering method (MICROTRACTMUPA 150, manufactured by Leed & Northrup Co.), which was deemed as the average particle diameter.

A measurement of metal adsorption capacity, an evaluation of HF adsorption capacity, and an evaluation of life characteristics were carried out in the same manner as in Example 1.

Comparative Example 5

Tobermorite A obtained by ball milling natural tobermorite, and boehmite as a second inorganic particle were mixed at a weight ratio of 1/1 to obtain a mixed inorganic filler J. The average particle diameter of the tobermorite A was 1200 nm, and the average particle diameter of boehmite was 650 nm. Using the mixed inorganic filler J, a multilayer structure separator containing the mixed inorganic filler J was obtained in the same manner as in Example 1. In the separator, the volume ratio of the tobermorite A in the porous layer containing the layered calcium silicate hydrate was 48 volume-%. A measurement of metal adsorption capacity, an evaluation of HF adsorption capacity, and an evaluation of life characteristics were carried out in the same manner as in Example 1. In this regard, for the evaluation of metal adsorption capacity and HF adsorption capacity, the tobermorite A and the second inorganic particle were used after premixing.

The measurement and evaluation results of Examples 1 to 15 and Comparative Examples 1 to 5 are presented in the following Table 1.

TABLE 1

| | Particle type | | | | Electronegativity (Pauling) | | | Life characteristics | | | | Metal adsorptive capacity | |
|---|---|---|---|---|---|---|---|---|---|---|---|---|---|
| | First inorganic particle | | Second inorganic particle | | Element/Electronegativity [Object element Mn/1.5] | Exchangeable cation | Interlayer distance (nm) | Capacity retention rate (%) | | | Micro short circuit | Adsorption rate (%) | HF adsorptive capacity |
| | Filler type | Average particle diameter (nm) | Filler type | Average particle diameter (nm) | | | | 40 cycles | 60 cycles | 100 cycles | | | |
| Example 1 | Calcium silicate hydrate A | 100 | — | — | Ca/1.0 | Ca ion | 1.1 | 94 | 88 | 62 | Not occurred | 6 | Good |
| Example 2 | Calcium silicate hydrate B | 300 | — | — | Ca/1.0 | Ca ion Na ion | 1.1 | 97 | 91 | 64 | Not occurred | 12 | Good |
| Example 3 | Calcium silicate hydrate C | 30 | — | — | Ca/1.0 | Ca ion | 1.1 | 96 | 88 | 65 | Not occurred | 37 | Good |
| Example 4 | Calcium silicate hydrate D | 40 | — | — | Ca/1.0 | Ca ion | 1.1 | 96 | 86 | 64 | Not occurred | 71 | Good |
| Example 5 | Zirconium phosphate A | 300 | — | — | Zr/1.4 | Hydrogen ion | 0.7 | 93 | 81 | 62 | Not occurred | 24 | Good |
| Example 6 | Zirconium phosphate B | 290 | — | — | Zr/1.4 | Hydrogen ion Li ion | 0.7 | 93 | 82 | 63 | Not occurred | 24 | Good |
| Example 7 | Calcium silicate hydrate A | 100 | Alumina | 1150 | Ca/1.0 | Ca ion | 1.1 | 97 | 93 | 70 | Not occurred | 3 | Good |

TABLE 1-continued

| | Particle type | | | | Electronegativity (Pauling) Element/Electronegativity [Object element Mn/1.5] | Exchangeable cation | Interlayer distance (nm) | Life characteristics Capacity retention rate (%) | | | | Metal adsorptive capacity | |
|---|---|---|---|---|---|---|---|---|---|---|---|---|---|
| | First inorganic particle | | Second inorganic particle | | | | | | | | | | |
| | Filler type | Average particle diameter (nm) | Filler type | Average particle diameter (nm) | | | | 40 cycles | 60 cycles | 100 cycles | Micro short circuit | Adsorption rate (%) | HF adsorptive capacity |
| Example 8 | Calcium silicate hydrate A | 100 | Barium sulfate | 1550 | Ca/1.0 | Ca ion | 1.1 | 96 | 93 | 68 | Not occurred | 3 | Good |
| Example 9 | Calcium silicate hydrate A | 100 | Boehmite | 650 | Ca/1.0 | Ca ion | 1.1 | 97 | 93 | 70 | Not occurred | 3 | Good |
| Example 10 | Calcium silicate hydrate B | 300 | Boehmite | 650 | Ca/1.0 | Ca ion Na ion | 1.1 | 98 | 95 | 72 | Not occurred | 6 | Good |
| Example 11 | Calcium silicate hydrate C | 30 | Boehmite | 650 | Ca/1.0 | Ca ion | 1.1 | 99 | 96 | 73 | Not occurred | 17 | Good |
| Example 12 | Calcium silicate hydrate D | 40 | Boehmite | 650 | Ca/1.0 | Ca ion | 1.1 | 98 | 95 | 71 | Not occurred | 35 | Good |
| Example 13 | Zirconium phosphate A | 300 | Boehmite | 650 | Zr/1.4 | Hydrogen ion | 0.7 | 97 | 92 | 67 | Not occurred | 12 | Good |
| Example 14 | Zirconium phosphate B | 290 | Boehmite | 650 | Zr/1.4 | Hydrogen ion Li ion | 0.7 | 96 | 93 | 69 | Not occurred | 12 | Good |
| Example 15 | Calcium silicate hydrate A | 100 | Calcium silicate | 850 | Ca/1.0 | Ca ion | 1.1 | 98 | 93 | 70 | Not occurred | 3 | Good |
| Comparative Example 1 | Zeolite | 100 | — | — | Al/1.5 | — | — | 85 | 23 | 5 | Occurred | 0 | Poor |
| Comparative Example 2 | Aluminum silicate | 60 | — | — | Al/1.5 | — | — | 83 | 22 | 5 | Occurred | 0 | Poor |
| Comparative Example 3 | Boehmite | 650 | — | — | Al/1.5 | — | — | 84 | 22 | 4 | Occurred | 0 | Poor |
| Comparative Example 4 | Lithium nickel cobalt manganese oxide | 500 | — | — | Mn/1.5 | Li ion | 0.5 | 80 | 20 | 3 | Occurred | 0 | Poor |
| Comparative Example 5 | Tobermorite A | 1200 | Boehmite | 650 | Ca/1.0 | Ca ion | 1.1 | 91 | 76 | 61 | Occurred | 4 | Good |

From Table 1, it is obvious that in Examples 1 to 15 using calcium silicate hydrate or zirconium phosphate, favorable metal adsorption capacity is exhibited even in the presence of an electrolyte salt, the retention rate of the discharge capacity in connection with the life characteristics is as high as 94% or even more, and the micro short circuit does not occur indicating superior safety. In particular, when any of calcium silicates A to D is used, it is obvious that the retention rate of the discharge capacity in connection with the life characteristics may be high. Especially when a second inorganic particle is mixed as in Examples 7 to 15, it is obvious that a higher retention rate of the discharge capacity may be exhibited compared to a case where each inorganic filler is used singly. This high retention rate of the discharge capacity is surprising in view of the fact that the metal adsorption characteristics in the electrolytic solution are reduced by mixing. The results may be presumably explained from that aggregation of the adsorbent was inhibited by the second inorganic particle to achieve favorable metal adsorption and HF adsorption. The increase rate of the retention rate of the discharge capacity is especially remarkable with the calcium silicate C and the calcium silicate D described in Examples 11 and 12. The calcium silicate C and the calcium silicate D are prone to aggregate due to their small particle sizes. It is presumed that a high retention rate of the discharge capacity even surpassing Examples 9 and 10 may be achieved because aggregation of the calcium silicate C and the calcium silicate D, which are prone to aggregate, may be still suppressed. On the other hand, in Comparative Examples 1 to 4, favorable metal ion adsorption capacity in the presence of an electrolyte salt is not exhibited, and in connection with the life characteristics the retention rate of the discharge capacity is inferior and a micro short circuit is prone to occur. In Comparative Example 5, although the tobermorite A, which exhibits metal adsorption capacity and HF adsorption capacity, is used, it is obvious that the retention rate of the discharge capacity does not exceed 91%, and is inferior to any of Examples, and further a micro short circuit is prone to occur.

INDUSTRIAL APPLICABILITY

The nonaqueous electrolyte secondary battery according to the present embodiment may be used as power sources for various consumer appliances, power sources for automobiles, and the like.

The invention claimed is:

1. An inorganic particle for a nonaqueous electrolyte battery, comprising:
a layered compound comprising a metal element having an electronegativity smaller than manganese in a crystal structure of the compound, having an interlayer distance of from 0.40 nm to 2.0 nm and including an exchangeable cation other than a hydrogen ion between layers of the compound, wherein the BET specific surface area of the inorganic particle is 3 $m^2$/g or more.

2. The inorganic particle for a nonaqueous electrolyte battery according to claim 1, wherein the exchangeable cation is selected from the group consisting of an alkali metal ion, an alkaline earth metal ion, an ammonium ion, an organic cation, and any mixture thereof.

3. The inorganic particle for a nonaqueous electrolyte battery according to claim 1, wherein an adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours.

4. The inorganic particle for a nonaqueous electrolyte battery according to claim 1, wherein an HF concentration is less than 10 ppm, when 8 parts by weight of the inorganic particle is immersed in 100 parts by weight of a mixed liquid of 800 ppm of HF, 1 mol/L of $LiPF_6$, and a cyclic and/or linear carbonate in an atmosphere at 23° C. for 5 min.

5. The inorganic particle for a nonaqueous electrolyte battery according to claim 1, wherein the metal element constituting the inorganic particle and having an electronegativity smaller than manganese is an element of an alkali metal or an alkaline earth metal.

6. The inorganic particle for a nonaqueous electrolyte battery according to claim 5, wherein the inorganic particle is calcium silicate hydrate.

7. A battery constituent material comprising the inorganic particle for a nonaqueous electrolyte battery according to claim 1.

8. A nonaqueous electrolyte battery provided with an adsorptive layer comprising the inorganic particle for a nonaqueous electrolyte battery according to claim 1.

9. The nonaqueous electrolyte battery according to claim 8 comprising a positive electrode, a negative electrode, and a separator as battery constituent materials, wherein the adsorptive layer is formed at least inside the separator, on facing surfaces of the positive electrode and the separator, or on facing surfaces of the negative electrode and the separator, and the formed adsorptive layer is formed entirely or partially inside the separator, or entirely or partially on any of the respective facing surfaces.

10. A mixture of inorganic particles for a nonaqueous electrolyte battery, comprising a first inorganic particle and a second inorganic particle,
wherein the first inorganic particle comprises a layered compound comprising a metal element having an electronegativity smaller than manganese in a crystal structure of the compound, having an interlayer distance of from 0.40 nm to 2.0 nm and including an exchangeable cation between layers of the compound,
wherein the second inorganic particle has an average particle diameter larger than the average particle diameter of the first inorganic particle, and wherein the BET specific surface area of the first inorganic particle is 3 $m^2$/g or more.

11. The mixture of inorganic particles for a nonaqueous electrolyte battery according to claim 10, wherein the average particle diameter of the first inorganic particle is from 0.01 μm to 2 μm, and the average particle diameter of the second inorganic particle is from 0.1 μm to 3 μm.

12. The mixture of inorganic particles for a nonaqueous electrolyte battery according to claim 10, wherein the shape of the second inorganic particle is plate-like.

13. The mixture of inorganic particles for a nonaqueous electrolyte battery according to claim 10, wherein with respect to the first inorganic particle, an adsorption rate of $Mn^{2+}$ ions is 5% or more, when 0.035 parts by weight of the inorganic particle is immersed in 100 parts by weight of a mixed liquid of 5 ppm of $Mn^{2+}$ ion, 1 mol/L of $LiPF_6$, and a cyclic and/or linear carbonate in an atmosphere at 23° C. for 6 hours.

14. The mixture of inorganic particles for a nonaqueous electrolyte battery according to claim 10, wherein with respect to the first inorganic particle, an HF concentration is less than 10 ppm, when 8 parts by weight of the inorganic particle is immersed in 100 parts by weight of a mixed liquid of 800 ppm of HF, 1 mol/L of $LiPF_6$, and a cyclic and/or linear carbonate in an atmosphere at 23° C. for 5 minutes.

15. A battery constituent material comprising the mixture of inorganic particles for a nonaqueous electrolyte battery according to claim 10.

16. A nonaqueous electrolyte battery provided with an adsorptive layer comprising the mixture of inorganic particles for a nonaqueous electrolyte battery according to claim 10.

17. The nonaqueous electrolyte battery according to claim 16 comprising a positive electrode, a negative electrode, and a separator as battery constituent materials, wherein the adsorptive layer is formed at least inside the separator, on facing surfaces of the positive electrode and the separator, or on facing surfaces of the negative electrode and the separator, and the formed adsorptive layer is formed entirely or partially inside the separator, or entirely or partially on any of the respective facing surfaces.

* * * * *